(12) United States Patent
Kanematsu et al.

(10) Patent No.: US 6,287,504 B1
(45) Date of Patent: *Sep. 11, 2001

(54) PLASTIC MOLDING AND METHOD AND APPARATUS FOR PRODUCING THE SAME BY INJECTION MOLDING

(75) Inventors: Toshihiro Kanematsu; Yasuo Yamanaka; Akira Fukushima; Kiyotaka Sawada; Motoyasu Murai, all of Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,050

(22) Filed: Apr. 1, 1998

(30) Foreign Application Priority Data

Apr. 1, 1997 (JP) .................................................. 9-082985
Jun. 23, 1997 (JP) .................................................. 9-183049
Jul. 10, 1997 (JP) .................................................. 9-184244

(51) Int. Cl.$^7$ .............................. B29C 45/73; B29D 11/00
(52) U.S. Cl. ........................ 264/327; 264/1.9; 264/328.16
(58) Field of Search ............................ 264/1.1, 1.9, 327, 264/328.16, 500, 572; 425/552

(56) References Cited

U.S. PATENT DOCUMENTS

| | | | |
|---|---|---|---|
| 2,911,678 | * 11/1959 | Brunfeldt | 264/327 |
| 3,608,058 | * 9/1971 | Coffman | 264/327 |
| 4,101,628 | * 7/1978 | Wiik | 264/327 |
| 4,548,773 | * 10/1985 | Suh et al. | 264/327 |
| 4,963,312 | * 10/1990 | Muller | 264/327 |
| 5,603,871 | 2/1997 | Koseko et al. . | |

* cited by examiner

*Primary Examiner*—Mathieu D. Vargot
(74) *Attorney, Agent, or Firm*—Oblon, Spivak, McClelland, Maier & Neustadt, P.C.

(57) ABSTRACT

A plastic molding for use in an optical device, a method of producing the molding by injection molding, and an apparatus for practicing the method are disclosed. Only a part of a molding expected to sink is surely caused to sink while, e.g., a mirror surface is surely transferred to a desired part of the molding.

5 Claims, 22 Drawing Sheets

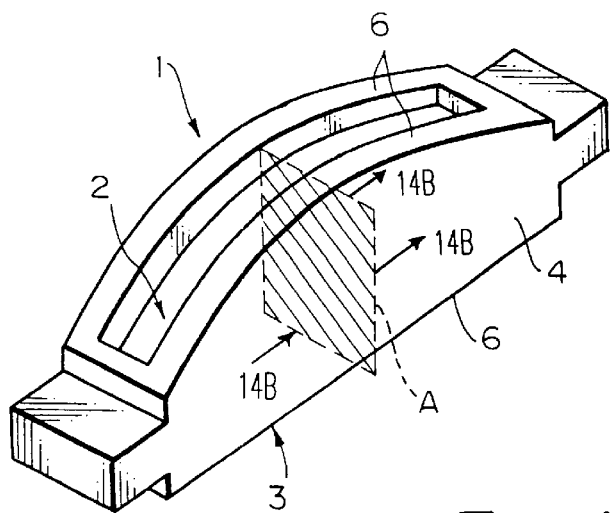
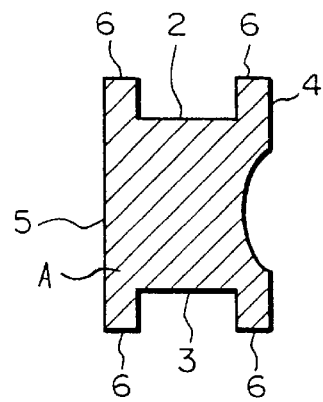
Fig. 14A  Fig. 14B
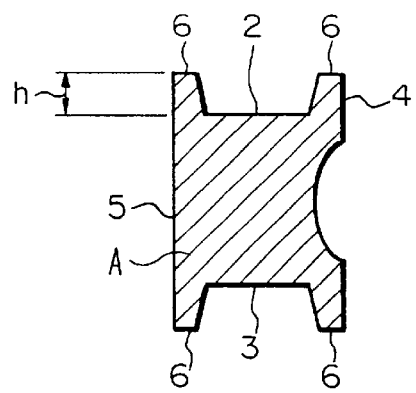
Fig. 15
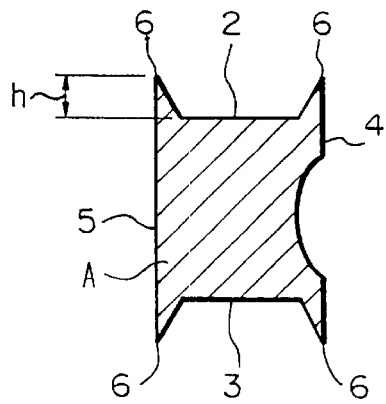
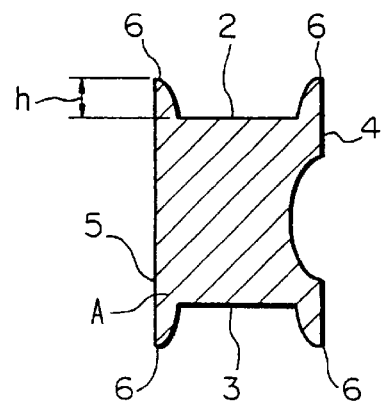
Fig. 16A  Fig. 16B

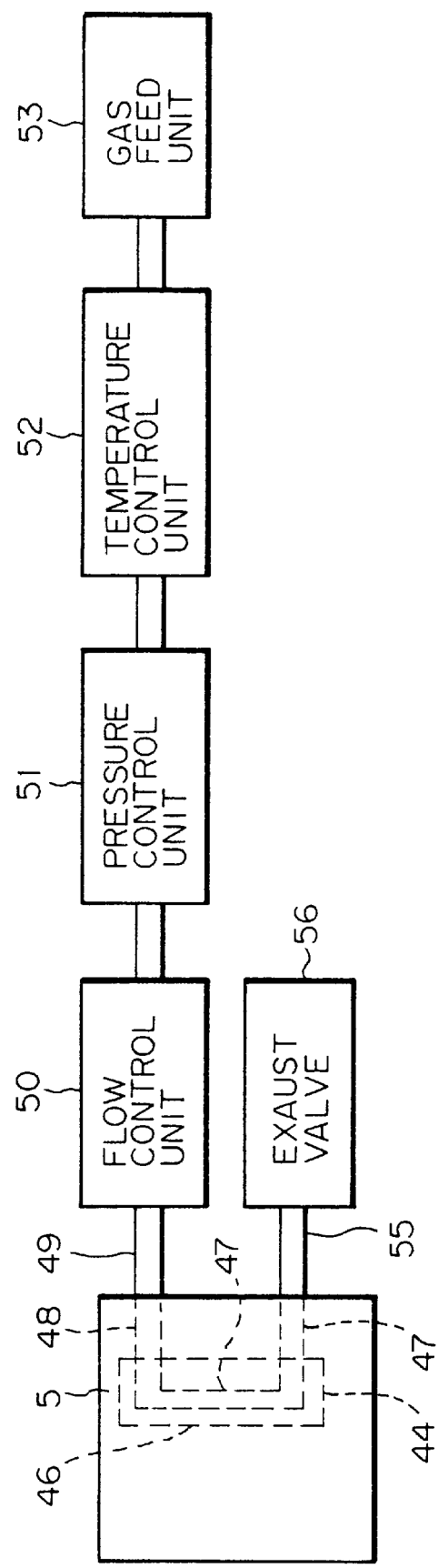

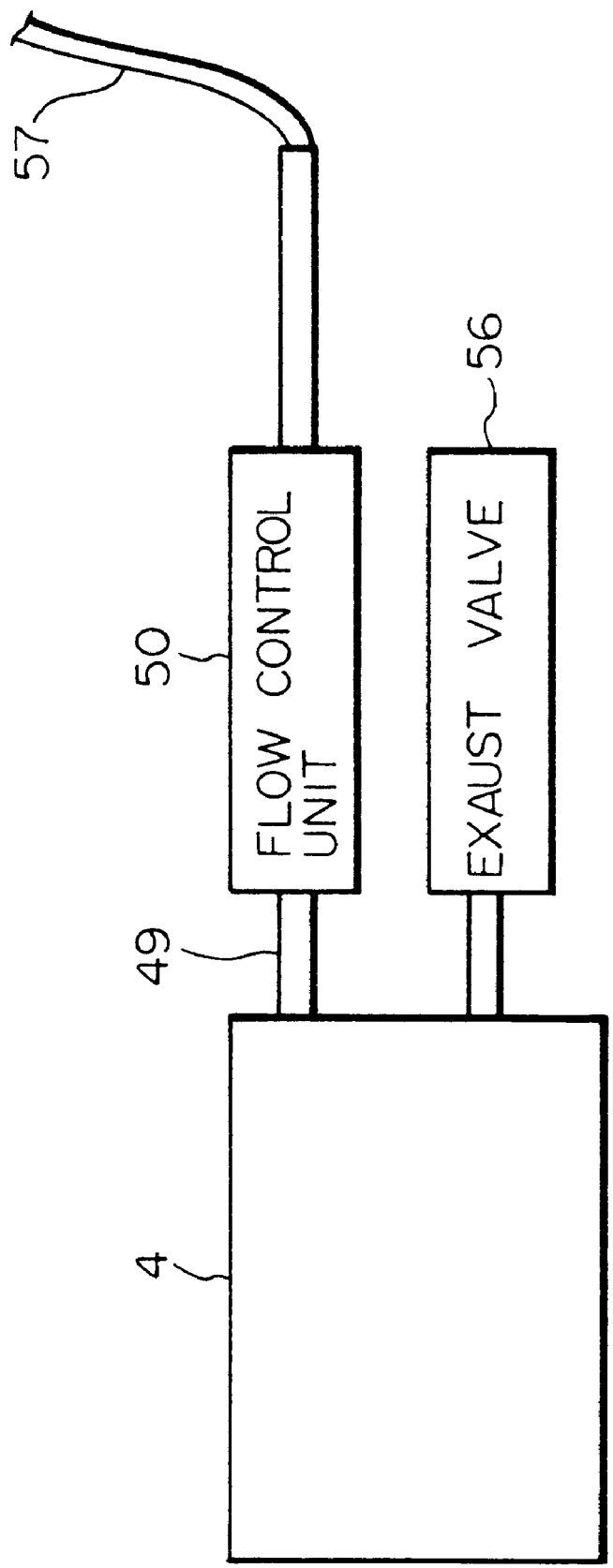

PLASTIC MOLDING AND METHOD AND APPARATUS FOR PRODUCING THE SAME BY INJECTION MOLDING

BACKGROUND OF THE INVENTION

1. Field of the Invention

The present invention relates to a lens, mirror, prism, or similar plastic molding produced by injection molding and included in an optical device, e.g., a copier, laser printer, facsimile apparatus or similar image forming apparatus, and a method and apparatus for producing the same. More particularly, the present invention is concerned with a plastic molding having, e.g., mirror surfaces and a fine undulation pattern transferred thereto with high accuracy by injection molding, and a method and apparatus for producing the same.

2. Discussion of Background

For injection molding, it is a common practice to use a mold assembly including a mold surface forming a cavity having a preselected volume, a transfer surface formed on the mold surface for transferring a mirror surface to a molding, and a gate open at the mold surface and having a preselected opening area. Molten resin is injected into the cavity via the gate and then cooled. The resulting molding is taken out by opening the mold assembly. While such a molding, particularly a mirror, lens, prism or similar optical element, is required to have an accurate mirror surface and a uniform refractive index, the mirror surface needing a high surface accuracy is caused to sink because the molten resin contracts at the time of solidification.

Injecting molding methods for solving the above-described problem are taught in, e.g., Japanese Patent Laid-Open Publication Nos. 3-128218, 8-234005, 3-151218, and 3-281213 (Prior Art 1 hereinafter). In prior art 1, a non-transfer surface or mold surface, which faces a transfer surface, is formed with, e.g., a roughened mirror surface or a surface treatment for lowering wettability. Otherwise, use may be made of a porous material. Injection is stopped just before a cavity is filled up with molten resin. Then, the molten metal is solidified by cooling without any dwelling. As a result, the roughened surface is caused to sink due to a difference in adhering force between the molten resin, the transfer surface, and the roughened surface. This prevents the mirror from sinking. Alternatively, an overflow portion for receiving excess molten resin is located outside of the cavity. When the overflow portion begins to be filled, injection is stopped. Then, the molten resin is solidified by cooling without any dwelling. This also allows the roughened surface to sink due to a difference in adhering force between the resin, the transfer surface, and the roughened surface.

An injection molding method disclosed in Japanese Patent Laid-Open Publication No. 2-175115 (Prior Art 2 hereinafter) injects molten metal into a cavity in which a porous member, which communicates with a compressed gas, is provided on a mold surface contacting the nontransfer surface of a molding. While dwelling and cooling are under way after the injection of the molten resin, air is fed to the non-transfer surface of the molding via the porous member. With this method, a side of a cylindrical thin lens may be caused to sink.

Japanese Patent Laid-Open Publication No. 6-304973 (Prior Art 3 hereinafter) proposes an injection molding method in which a non-transfer surface communicates with the outside air via a vent hold. During an interval between the beginning and the end of the injection of molten resin into a cavity, a pressure difference is generated between the transfer surface and the nontransfer surface of the resin. As a result, the non-transfer surface of the resin is caused to sink. Specifically, air is brought into contact with the molten resin, on a surface other than the mirror portion transferred from the transfer surface, via the vent hole and a bore communicating therewith, so that the cooling speed of the resin is lowered. At the same time, a preselected air pressure is fed to the vent hole in order to generate a preselected pressure difference between the mirror portion of the resin and the vent hole. This allows only the portion of the resin facing the vent hole to sink, i.e., prevents the mirror portion form sinking. In addition, because only the vent hole portion of the resin sinks, a molding can be produced by simple control over the amount of the resin to be injected into the cavity and without any strain being generated in the resin. The resulting molding is therefore free from an internal strain and is provided with an accurate mirror surface.

Prior Art 3 further teaches that the vent hole may communicate with a compressor so as to apply a preselected air pressure to the vent hole portion of the resin. With this configuration, it is possible to generate any desired pressure difference between the mirror surface portion and the vent hole portion of the resin, thereby causing the vent hole portion to sink. In addition, the pressure difference is readily adjustable in order to further enhance the accuracy of the mirror surface without any internal strain.

Japanese Patent Laid-Open Publication No. 6-315961 (Prior Art 4 hereinafter) teaches an injection molding method causing the non-transfer surface of resin to sink. In accordance with this method, the transfer surface of a mold is heated to and held at a high temperature. The transfer surface side of the resin is heated to a high temperature until the injection of molten resin into a cavity ends.

However, Prior Art 1 relying on the roughened surface, surface treatment or porous material results in an expensive mold assembly. Moreover, stopping the injection just before the cavity is filled up with the molten resin is extremely difficult. Should the correct timing for stopping the injection of molten resin not be realized, the relationship in the adhering forces between the transfer surface and the roughened surface would be inverted and would thereby cause the mirror surface to sink or result in being short of resin. In addition, because sinking cannot be provided with directionality and because setting the molding conditions is difficult, the configuration of the molding is critically limited. It is more preferable that the injection of the molten resin be stoppable at any time lying in a broader range. However, in this case, the overflow portion, which is formed integrally with the molding, must be removed by an extra step. Moreover, if the area of the opening of the gate for feeding the molten resin to the overflow portion be excessively small, the relation in adhering forces between the transfer surface and the roughened surface would also be inverted and would thereby cause the mirror surface to sink and there would not be enough molten resin.

Prior art 1 can implement a mirror or similar optical element needing a single mirror surface because it roughens the mold surface facing the transfer surface. However, Prior Art 1 cannot produce a lens, prism or similar optical element because the number and the positions of the mirror surfaces are limited. In addition, the relation in adhering force is inverted and causes the mirror surface to sink, depending on the material constituting the transfer surfaces and roughened surface and the kind of resin used.

Prior Art 2 increases the cost of the mold assembly due to the porous member and provides more sophisticated control over the configuration of the porous member. Specifically, if the effect of the porous member is excessive, it not only admits the molten material thereinto, by also obstructs the parting of the molding. This is particularly true when the porous portion of the porous member extends inwardly over the wall of the mold. Further, because the compressed gas is fed to the non-transfer surface of the molding via the porous member during the previously stated interval, a pressure difference is maintained between the non-transfer surface and the transfer surface of the resin during cooling. As a result, the internal strain remains in the resulting molding after the opening of the mold. The residual pressure not only lowers the accuracy of the transfer surface, but also causes the entire molding to deform.

Prior Art 3 generates a pressure difference between the transfer surface and the nontransfer surface of the resin during the interval mentioned earlier. This also brings about the problem stated above in relation to Prior Art 2. Prior Art 4 maintains the transfer surface of the mold at high temperature and heats the transfer surface side of the resin to a high temperature during the previously mentioned interval. This is also undesirable in the above respect.

SUMMARY OF THE INVENTION

It is therefore an object of the present invention to provide a plastic molding, wherein only a desired portion thereof sinks and wherein a mirror surface is provided in another desired portion thereof, and a method and an apparatus for producing the same by injection molding.

It is another object of the present invention to provide an inexpensive and least deformable plastic molding, wherein only a non-transfer surface thereof sinks and so that the molding has a highly accurate transfer surface.

In accordance with the present invention, in a molding produced by an injection molding assembly having a pair of molds including a mold surface forming a cavity having a preselected volume, at least one transfer surface for transferring a mirror surface formed on the mold surface to the molding, and a gate for filling the cavity with a molten material by injection, and by injecting the molten material into the cavity via the gate and then cooling the molten material, the injection mold assembly includes at least one vent hole having a preselected opening area, and at least one bore communicating with the vent hole for applying a preselected air pressure to the molding. A step portion is formed on the mold surface between the vent hole and the transfer surface.

Also, in accordance with the present invention, in an injection molding method for producing a molding by using a mold assembly having a pair of molds including a mold surface forming a cavity having a preselected volume, at least one transfer surface for transferring a mirror surface formed on the mold surfaces to the molding, and a gate for filling the cavity with a molten material by injection, and by injecting the molten material into the cavity via the gate and then cooling the molten material, the mold surface is formed with, outside the transfer surface, at least one vent hole having a preselected opening area and at least one bore communicating with the vent hole for applying a preselected air pressure to the molding material. The air pressure is continuously generated via the vent hole even after the pressure of the molding material in the cavity has dropped to zero.

Further, in accordance with the present invention, a mold assembly has a pair of molds including a mold surface forming a cavity having a preselected volume, at least one transfer surface for transferring a mirror surface formed on the mold surface to the molding, and a gate for filling the cavity with a molten material by injection, and injects the molten material into the cavity via the gate and then cools the molten material. The mold surface is formed with, outside of the transfer surface, at least one vent hole having a preselected opening area and at least one bore communicating with the vent hole for applying a preselected air pressure to the molding material, and at least one exhaust hole located at a position adjoining the vent hole, but not facing the transfer surface.

Moreover, in accordance with the present invention, a method of producing a plastic molding begins with the step of preparing a mold assembly including at least one transfer surface and at least one non-transfer surface formed on a surface other than the transfer surface. The transfer surface and non-transfer surface forms at least one cavity. Molten resin heated to a temperature above a softening point thereof is injected into the cavity. A resin pressure is caused to act on the transfer surface to thereby cause the resin to adhere to the transfer surface, and then the resin is cooled to a temperature below the softening point. The mold assembly is opened in order to allow the resulting molding to be taken out. The temperature of at least one non-transfer surface of the resin is lowered below the temperature of the resin on the transfer surface during an interval between the beginning and the end of injection of the molten resin into the cavity.

BRIEF DESCRIPTION OF THE DRAWINGS

The above and other objects, features and advantages of the present invention will become more apparent from the following detailed description taken with the accompanying drawings in which:

FIG. 14A is a perspective view of a molding representative of a seventh embodiment of the present invention;

FIG. 14B is a cross-sectional view taken along plane A of FIG. 14A;

FIG. 15 is a cross-sectional view of a molding representative of an eighth embodiment of the present invention and including tapered steps;

FIGS. 16A and 16B are cross-sectional views each showing a particular configuration of a molding representative of a ninth embodiment of the present invention;

FIG. 31 is a top plan view showing a method and an apparatus for producing a plastic molding representative of an eighteenth embodiment of the present invention;

FIG. 35 shows a modification of the eighteenth embodiment.

DETAILED DESCRIPTION OF THE PREFERRED EMBODIMENTS

Figure 1:
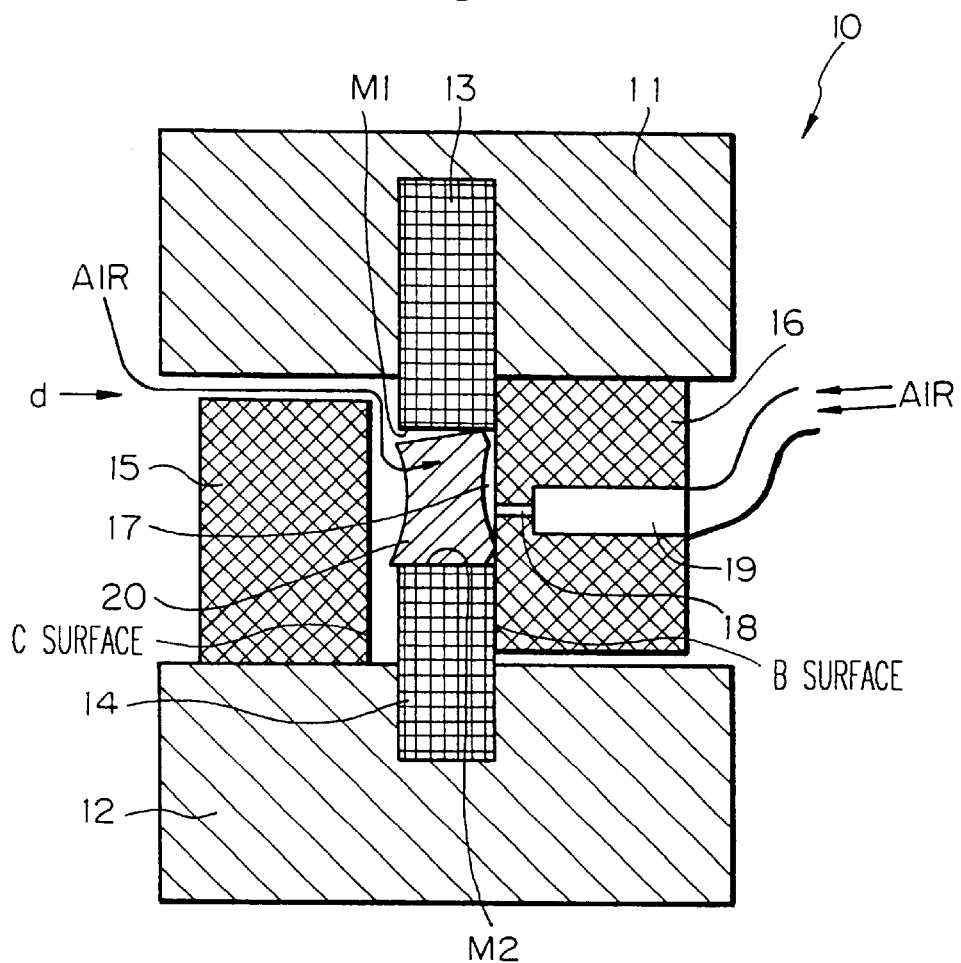
FIG. 1 is a fragmentary view showing a conventional injection mold assembly.

To better understand the present invention, brief reference will be made to the injection molding method taught in Prior Art 3 mentioned earlier. As shown, a mold assembly 10 is made up of a stationary mold 11 and movable mold 12, mirror pieces 13 and 14, a reference insert 15, and a sink insert 16 forming a cavity 17 having a preselected volume. The mirror pieces 13 and 14 having transfer surfaces or mold surfaces M1 and M2, respectively, for transferring mirror surfaces to a molding. The reference insert 15 has a mold surface defining the reference surface (c) surface) of a molding. The sink insert 16 has a mold surface implementing a surface for causing a molding to sink (B surface). Molten resin or similar molten molding material 20 is injected into the cavity 17 via a gate (not shown). The mold surface of the sink insert 16 is formed with a vent hole 18 having a preselected opening area, and a bore communicating with the vent hole 18. Air, under preselected pressure, is fed to the material 20 via the bore 19 and vent hole 18.

Figure 2:
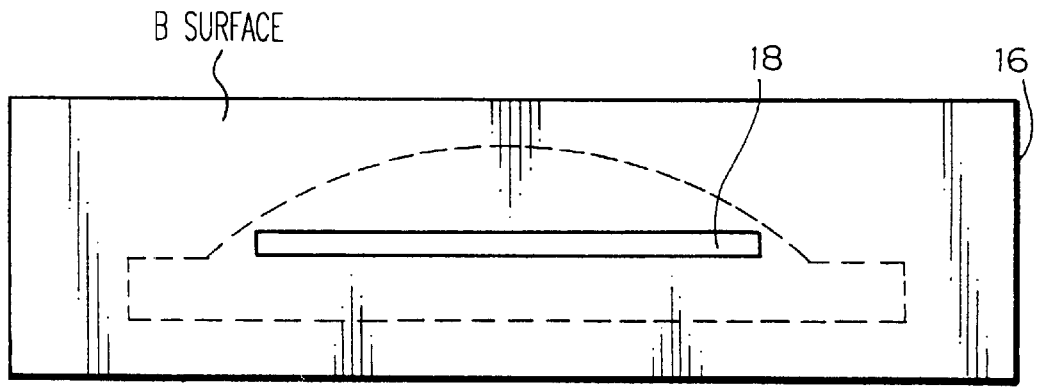
FIG. 2 is a plan view showing a specific vent hole formed in the mold surface of a sink insert included in the mold assembly of FIG. 1.

FIG. 2 shows a specific configuration of the vent holes 18 formed in the mold surface (B surface) of the sink insert 16. To feed air to the molten molding material 20, use may be made of natural draft utilizing a pressure difference between the mirror portion of the molten molding material 20 and the vent hole portion, or forced draft generating a desired pressure difference between the two portions with a compressor (not shown) communicating with the vent hole 18.

In the mold assembly 10, the vent hole 18 is positioned at the side of a molding which is expected to sink. When air is fed to the cavity 17 via the bore 19 and vent hole 18, sinking successfully occurs in the expected surface of the molding. In addition, the mirror surfaces of the mirror pieces 13 and 14 are desirably transferred to the molding. The molding therefore suffers from a minimum of internal strain.

Figure 3A:
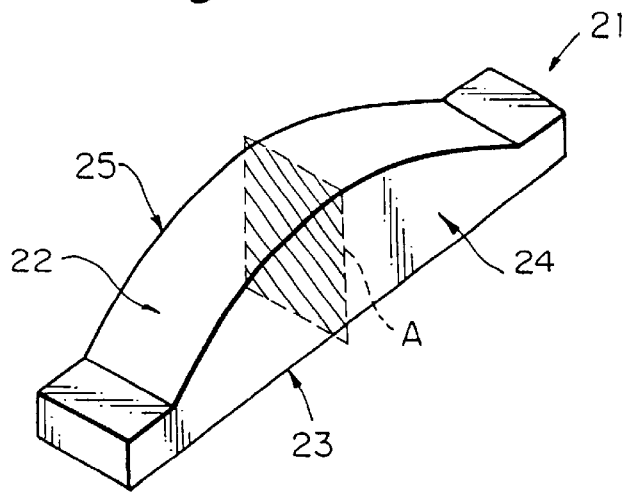
FIG. 3A is a perspective view showing a specific molding produced by the mold assembly of FIG. 1.
Figure 3B:
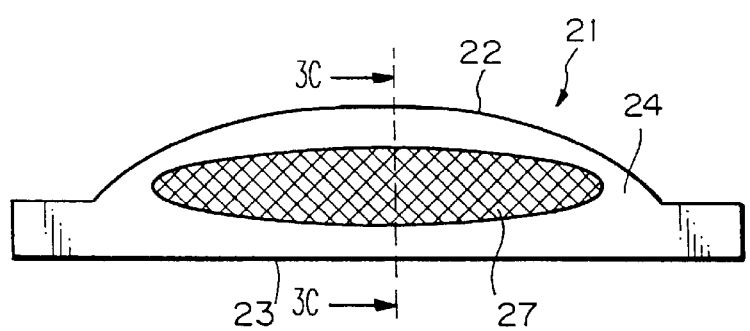
FIG. 3B is a side elevation of the molding of FIG. 3A.
Figure 3C:
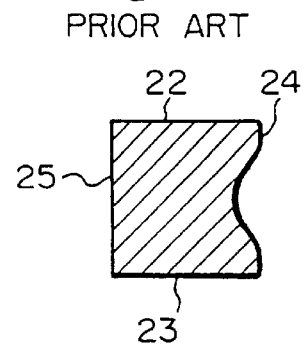
FIG. 3C is a cross-sectional view of FIG. 3B.

A specific molding 21, produced by the mold assembly 10, is shown in FIGS. 3A–3C. As shown, the molding is implemented as a rectangular lens having mirror surfaces (optical surfaces) 22 and 23 transferred from the mirror surfaces M1 and M2, respectively, of the mirror pieces 13 and 14, respectively. FIG. 3B shows the surface 24 of the lens 21 intended to sink (B surface). A sinking area is indicated by cross-hatching. As shown, desired sinking occurs on the B surface 24 of the lens 21. As a result, the mirror surface 22 and 23 are desirably transferred to the lens 21, reducing the internal strain of the lens 21.

Figure 4A:
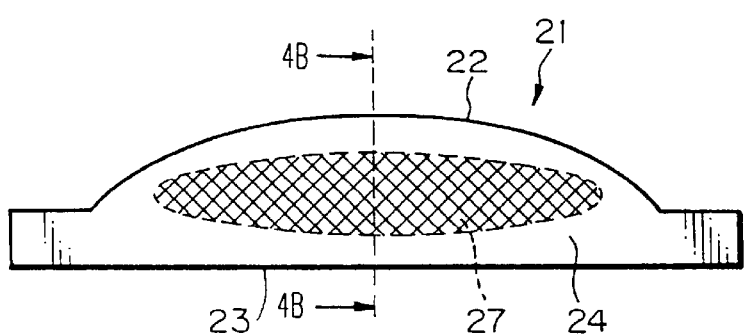
FIG. 4A is a side elevation showing a specific molding produced by injection molding with an air stream flowing toward the reference surface of a cavity.
Figure 4B:
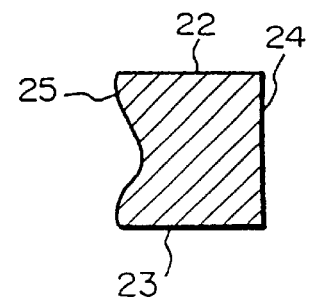
FIG. 4B is a cross-sectional view taken along line A of FIG. 4A.

However, the injection mold assembly 10 has the following problems left unsolved. If the various mold parts 11–16 constituting the mold assembly 10 lack in accuracy, either individually or in combination, a gap d is formed between the parts, as shown in FIG. 1. Then, air is likely to flow into the cavity 17 via the gap d and prevent the desired surface from sinking. FIGS. 4A and 4B are views similar to FIGS. 3A and 3B, showing a lens 21 molded with an air stream flowing into the reference surface side (c) surface) of the cavity 17. As shown, the lens 21 fails to sink to a desired degree or practically fails to sink at its expected surface (B surface). In the worst case, a C surface 25 is caused to sink and loses surface accuracy as a reference surface.

Figure 5A:
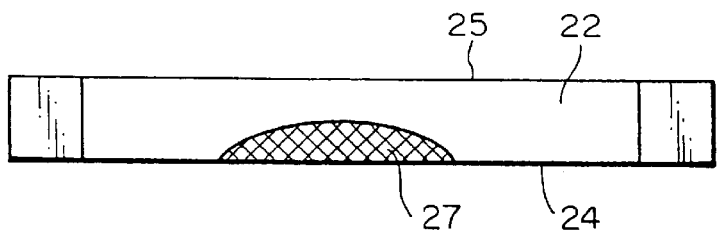
FIG. 5A is a top plan view showing a specific molding produced by injection molding and caused to sink as far as its mirror surface portion.
Figure 5B:
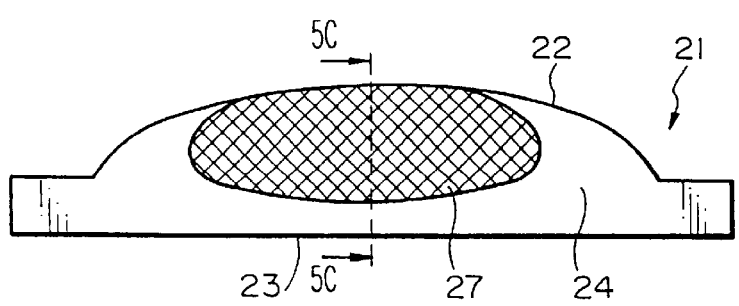
FIG. 5B is a side elevation of the molding shown in FIG. 5A.
Figure 5C:
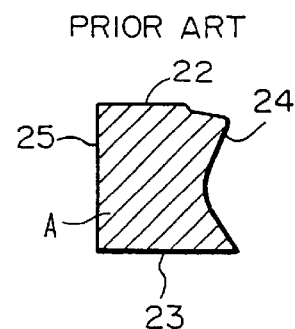
FIG. 5C is a cross-sectional view taken along line A of FIG. 5B.

Further, when air is introduced into the cavity 17 via the vent hole 18 by either natural draft or forced draft, it is apt to reach the mirror surfaces 22 and 23 and cause them to sink also, depending on the amount of resin filled in the cavity 17 or the amount of air. A lens or molding 21 caused to sink as far as its mirror surfaces 22 and 23 is shown in a top plan view in FIG. 5A, in a side elevation in FIG. 5B, and in a cross-sectional view, taken along line A of FIG. 5B, in FIG. 5c. As shown, a sunk region 27 formed in the B surface 24 extends even to the mirror surface 22 and introduces a strain in the mirror surface 22, thereby deteriorating the ability of the lens.

Preferred embodiments of the present invention will be described hereinafter. It is to be noted that reference numerals designating the structural elements of each embodiment are independent of the others, i.e., identical reference numerals do not always designate identical structural elements.

Figure 6:
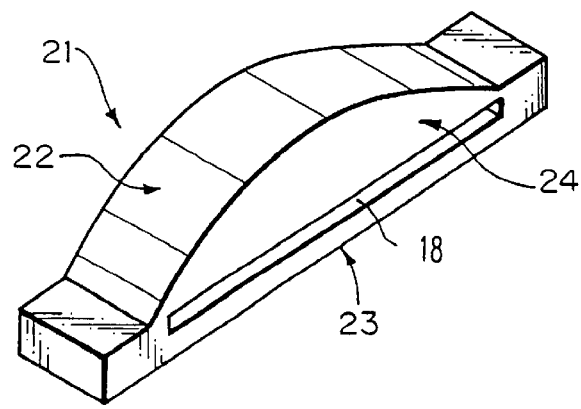
FIG. 6 shows a relation between the molding produced by the mold assembly of FIG. 1 and the position of a vent hole.

FIG. 6 is a prior art figure showing the positional relationship between the conventional molding 21 and the vent hole 18 of the mold assembly 10. The relationship shown in FIG. 6 brings out the problem discussed with reference to FIGS. 5A–5C. A first embodiment of the present invention eliminates such a problem by providing a molding with steps between a vent hole and mirror surfaces.

First Embodiment

Figure 7A:
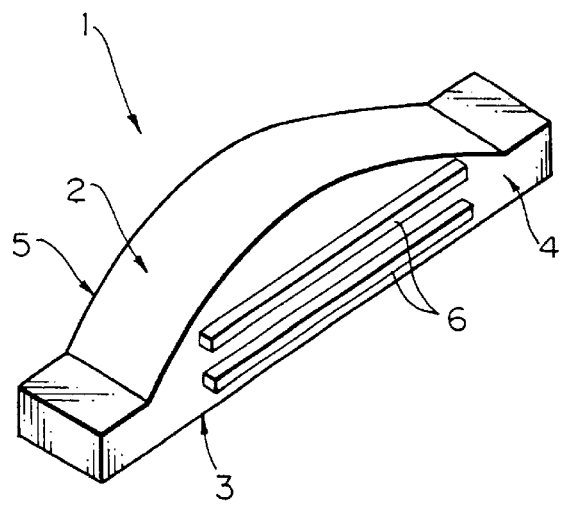
FIG. 7A is a perspective view showing a molding and an injection mold assembly representative of a first embodiment of the present invention.
Figure 7B:
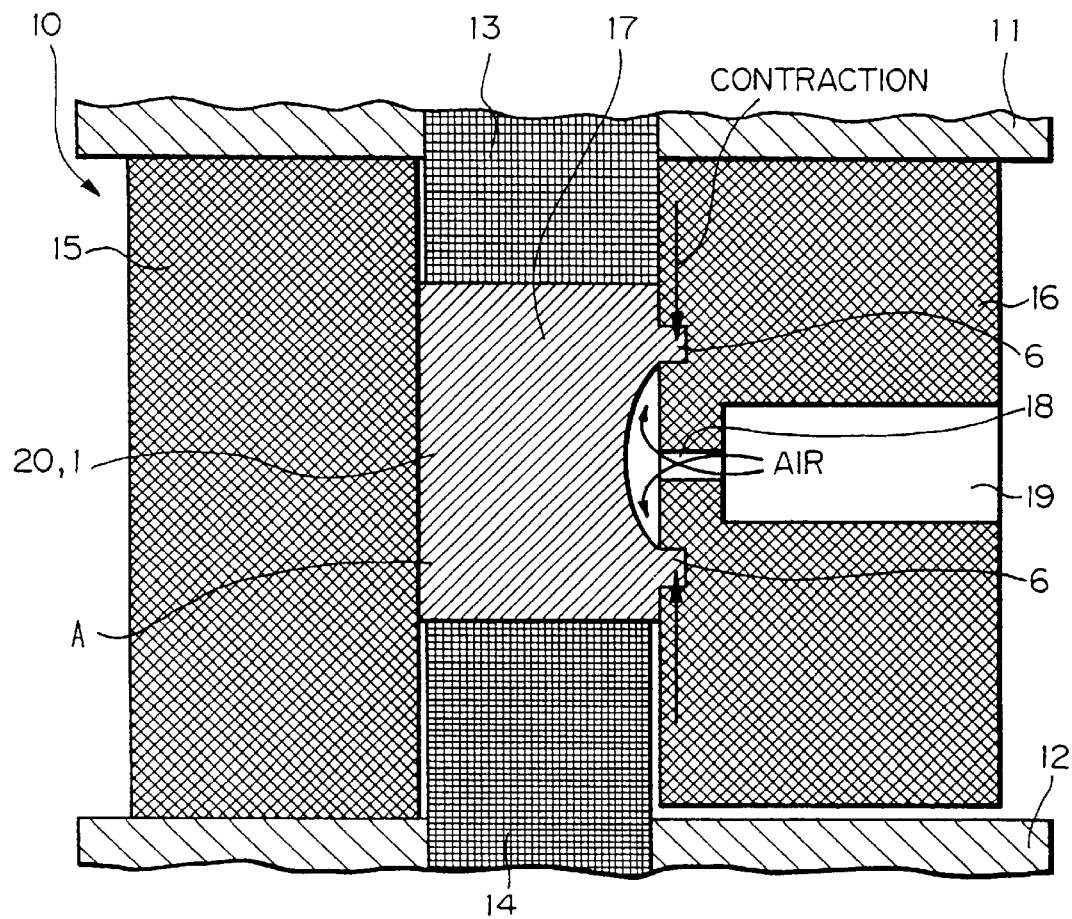
FIG. 7B is a fragmentary cross-sectional view of the mold assembly shown in FIG. 7A.

Specifically, FIG. 7A shows a specific molding 1 representative of the first embodiment. FIG. 7B shows a part of an injection mold assembly 10 for producing the molding 1. Basically, the mold assembly 10 is similar to the conventional mold assembly 10 shown in FIG. 1, and has its structural elements designated by the same reference numerals. The difference is that, as shown in FIG. 7B, the mold assembly 10 of the embodiment includes a cavity 17 and indentations formed in a sink insert 16 between a vent hole 18 and mirror surfaces of mirror inserts 13 and 14, wherein the indentations are for forming steps 6 on the molding 1.

More specifically, the molding 1 is implemented as a rectangular lens having two mirror surfaces (optical surfaces) 2 and 3 playing the role of lens surfaces. The lens 1 includes a surface 4 that will be allowed to sink (B surface). The steps 6 are formed on the surface 4 between the vent hole 18 and the opposite mirror surfaces 2 and 3, isolating the mirror surfaces 2 and 3 from the vent hole 18.

As shown in FIG. 7B, the sink insert 16 of the mold assembly 10 includes the indentations complementary in configuration to the steps 6 of the lens 1 and formed on the mold surface between the vent hole 18 and the mirror surfaces of the mirror inserts 13 and 14. Just after the molten resin or molten molding material 20 has been injected into the cavity 17 (between mirror inserts 13 and 14, reference insert 15, and sink insert 16), air is forced out of the cavity 17 via the vent hole 18 and a bore 19 due to the high internal pressure of the resin 20. The internal pressure of the resin 20 sequentially decreases as the resin 20 is cooled. When the pressure of the resin 20 decreases below the atmospheric pressure or below a compression pressure (i.e., when a compressor communicates with the vent hole 18 via the bore 19), air begins to flow into the cavity 17 via the vent hole 18, causing the resin 20 to sink away from the vent hole 18. If the resin 20 did not include the steps 6, the resin 20 might sink as far as the mirror surfaces of the mirror inserts 13 and 14. In the illustrative embodiment, the steps 6, which isolate the mirror surfaces 2 and 3 from the vent hole 18, tend to contract toward each other, as indicated by the arrows in FIG. 7B. However, the indentations of the sink insert 16 of the mold assembly 10 interfere with the steps 6 and prevent the steps 6 from contracting. As a result, the resin 20 and mold assembly 10 remain in close contact with each other and prevent sinking from proceeding over the steps 6 (i.e., confine the sinking to the region between the steps 6). The lens 1 is therefore caused to sink only in its expected portion and is surely formed with mirror surfaces 2 and 3 by means of a transfer mechanism.

Second Embodiment

Figure 8:
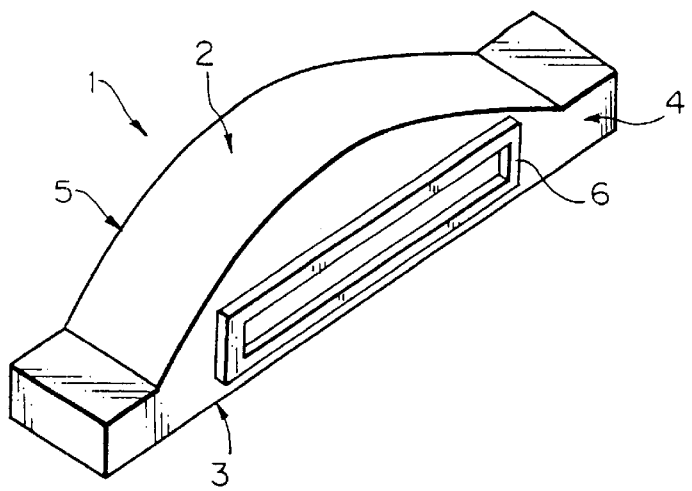
FIG. 8 is a perspective view of a molding representative of a second embodiment of the present invention.

FIG. 8 shows a molding 1 representative of a second embodiment of the present invention and produce by injection molding. The molding 1 is also implemented as a lens similar in configuration to the lens of FIG. 7A. As shown, a step 6 is formed on the B surface 4 of the lens 1 adjoining the vent hole (not shown) such that the step 6 surrounds the vent hole (not shown). The step 6 surrounding the vent hole (not shown) prevents air from turning around and allows the sinking region to be controlled more positively than in the first embodiment.

Third Embodiment

Figure 9A:
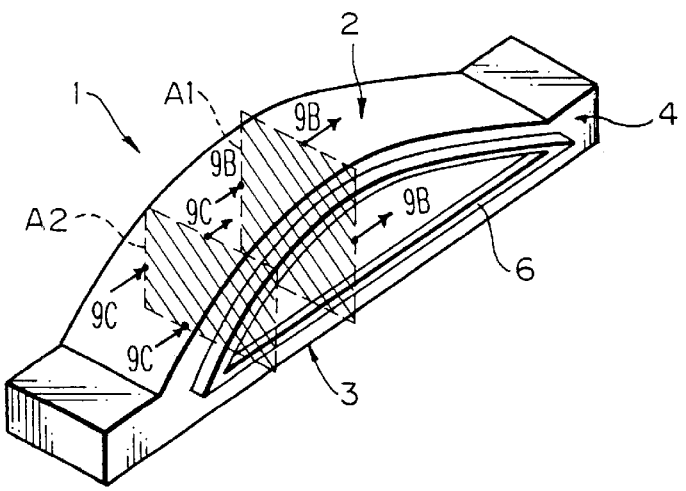
FIG. 9A is a perspective view of a molding representative of the third embodiment of the present invention.
Figure 9B:
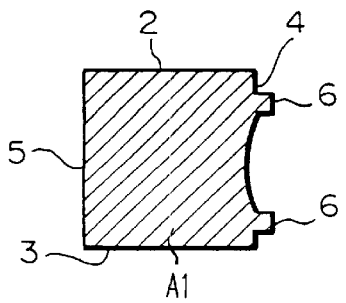
FIG. 9B is a cross-sectional view of the third embodiment in plane A1 of FIG. 9A.
Figure 9C:
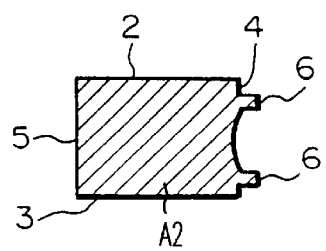
FIG. 9C is a cross-sectional view of the third embodiment in plane A2 of FIG. 9A.

FIGS. 9A–9C show a molding 1 representative of a third embodiment of the present invention. The molding 1 is also implemented as a lens similar in configuration to the lens of FIG. 7A. As shown, a step 6 is formed on the surface (B surface) 4 of the molding adjoining the vent hole (not shown). The step 6 is substantially similar in configuration to the contour of the surface 4. Specifically, when the molding 1 is a rectangular lens, the step 6 surrounds the vent hole (not shown) complementarily to the contour of the surface 4 of the lens 1. A sinking region can therefore be controlled in a ratio similar to the cross-sectional area of each cross-section of the molding 1 (section A1 or A2). This successfully makes the internal strain and surface accuracy uniform and thereby enhances the accuracy of the lens 1.

Figure 10A:
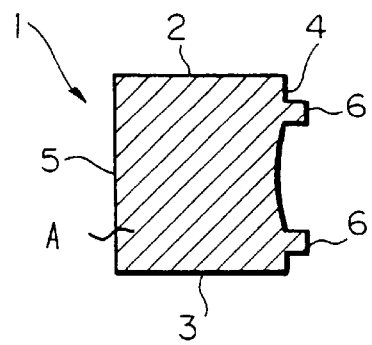
FIGS. 10A and 10B are cross-sectional views each showing a particular configuration of steps included in the third embodiment in the direction of height.
Figure 10B:
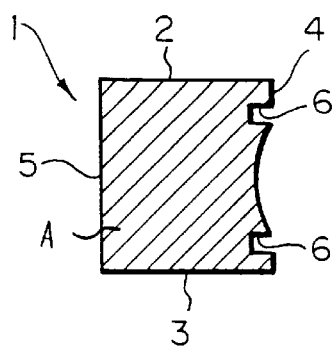

As shown in FIG. 10A, the steps 6, of the first to third embodiments, are each represented by projections in the direction of height. Alternatively, as shown in FIG. 10B, the steps 6 may be represented by recesses formed in the molding 1. The recesses are for controlling the sinking region. When the steps 6 are recesses, as shown in FIG. 10B, the mold assembly 10 will be formed with outwardly extending projections around the vent hole 18.

Fourth Embodiment

Figure 11A:
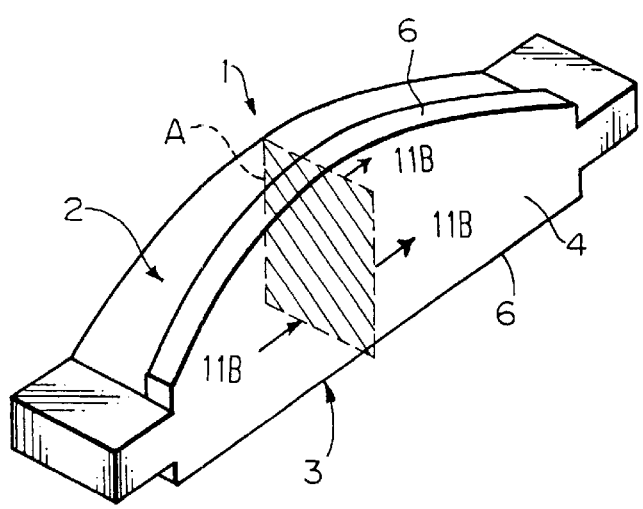
FIG. 11A is a perspective view of a molding representative of a fourth embodiment of the present invention.
Figure 11B:
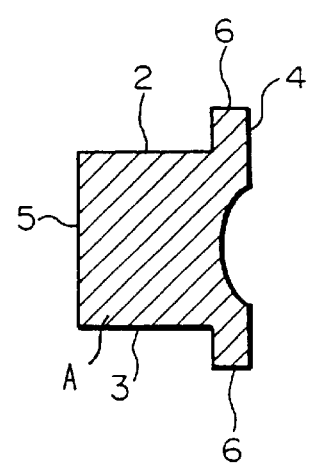
FIG. 11B is a cross-sectional view taken along plane A of FIG. 11A.

FIGS. 11A and 11B show a molding 1 representative of a fourth embodiment of the present invention. As shown, steps 6 are formed on the surfaces 2 and 3 of the molding 1 which are expected to sink. This configuration also prevents air from reaching the mirror surfaces 2 and 3 via the vent hole (not shown) because the steps 6 of the molding 1 and the indentations of the mold assembly (not shown) remain in close contact with each other.

Fifth Embodiment

Figure 12A:
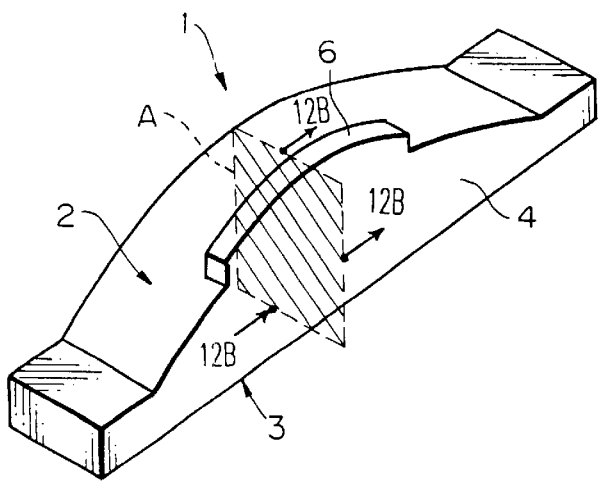
FIG. 12A is a perspective view of a molding representative of a fifth embodiment of the present invention.
Figure 12B:
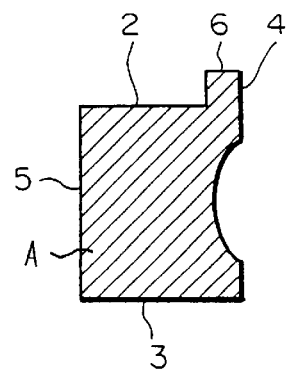
FIG. 12B is a cross-sectional view taken along plane A of FIG. 12A.

FIGS. 12A and 12B show a molding 1 representative of a fifth embodiment of the present invention. As shown, a step 6 is formed on a part of a mirror surface 2 or 3 expected to sink. Specifically, when it is known that air will turn around to a part of the mirror surface 2 or 3 and cause it to sink beforehand, the step 6 may be formed only in such a part of the mirror surface 2 or 3. This configuration saves cost when a mold assembly (not shown) is formed with a step 6.

Sixth Embodiment

Figure 13A:
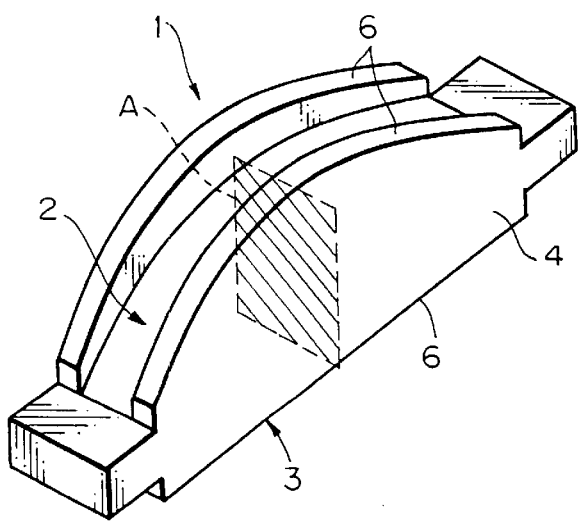
FIG. 13A is a perspective view of a molding representative of a sixth embodiment of the present invention.
Figure 13B:
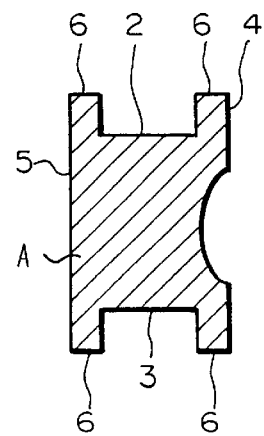
FIG. 13B is a cross-sectional view taken along plane A of FIG. 13A.

FIG. 13A shows a molding 1 representative of a sixth embodiment of the present invention. FIG. 13B is a cross-section from a plane A of FIG. 13A. As shown, steps 6 are formed on opposite edges of the mirror surface 2 contiguous with the B surface 4 and C surface 5. Likewise, steps 6 are formed on opposite edges of the other mirror surface 3 contiguous with the B surface 4 and C surface 5. As shown in FIG. 1, when the mold assembly 10 is not accurate, air is apt to enter the cavity 17 via an unexpected portion. As a result, as shown in FIGS. 14A and 14B specifically, air is likely to flow into the reference surface (c) surface) side of the cavity 17 and turn around to the mirror surface 2 and 3 to cause them to sink. In the illustrative embodiment, the steps 6 formed on both longitudinal edges of the mirror surface 2 and those of the mirror surface 3 prevent air from turning around to the mirror surfaces 2 and 3 and causing them to sink.

Seventh Embodiment

FIG. 14A shows a molding 1 representative of a seventh embodiment of the present invention. FIG. 14B is a cross-section in plane A of FIG. 14A. As shown, the molding 1 is identical with the molding shown in FIG. 13A except that the steps 6, facing each other of the mirror surfaces 2 and 3, are replaced with a single step 6 surrounding the mirror surface 2 or 3. The steps 6 can obstruct air mor positively and can therefore prevent the mirror surfaces 2 and 3 from sinking more positively.

Eighth Embodiment

To obstruct air tending to reach the mirror surfaces 2 and 3 of the molding 1, the steps 6, shown in FIG. 13B or 14B, suffice. FIG. 15 shows a molding 1 configured to be easily separable from a mold. As shown, the steps 6 are each provided with a draft or draught in the direction of height h. With the steps 6, the molding 1 can be easily separated from a mold assembly, while preserving its accuracy.

Ninth Embodiment

FIGS. 16A and 16B each shows a particular molding representative of a ninth embodiment of the present invention. As shown, steps 6, facing each other at both edges of each mirror surface 2 or 3, are provided with a triangular cross-section (FIG. 16A) or an accurate cross-section (FIG. 16B). This not only enhances the parting ability of the molding, but also simplifies the procedure for forming steps in, e.g., the mirror pieces 13 and 14.

In each of the eighth and ninth embodiments, the steps 6 each have a height h greater than 0.1 mm inclusive. Experiments showed that heights h greater than 0.1 mm inclusive c an sufficiently obstruct air.

Tenth Embodiment

This embodiment relates to a method of forming a molding and will be described with reference to FIG. 7B. First, the movable mold 12 carrying the mirror piece 14 and reference insert 15 therewith is brought into contact with the stationary mold 11 loaded with the other mirror insert 13 and reference insert 15. As a result, the mold surfaces of the molds 11 and 12 form the cavity 17 having a preselected volume. A gate (not shown) is formed in a mold surface (not shown) of the mold assembly 10 in order to inject the molten resin 20 into the cavity 17. A conventional filling machine (not shown) is connected to the gate in order to fill the cavity 17 with the molten resin 20 by injection.

Just after molten resin or molding material 20 has been injected into the cavity 17, air is forced out of the cavity 17 via the vent hole 18 and a bore 19 due to the high internal pressure of the resin 20. The internal pressure of the resin 20 sequentially decreases as the resin 20 is cooled. When the internal pressure of the resin 20 decreases below the atmospheric pressure or below a compression pressure (i.e., when a compressor communicates with a vent hole 18 via a bore 19), air begins to flow into the cavity 17 via the vent hole 18, causing the resin 20 to sink away from the vent hole 18. At this instant, the steps 6, isolating the mirror surfaces 2 and 3 from the vent hole 18, as shown in, e.g., FIG. 7A, tend to contract toward each other, as indicated by arrows in FIG. 7B. However, the indentations of the mold assembly 10 interfere with the steps 6 and prevent them from contracting. As a result, the resin 20 and mold assembly 10 remain in close contact with each other and prevent sinking from proceeding over the steps 6.

Figure 17A:
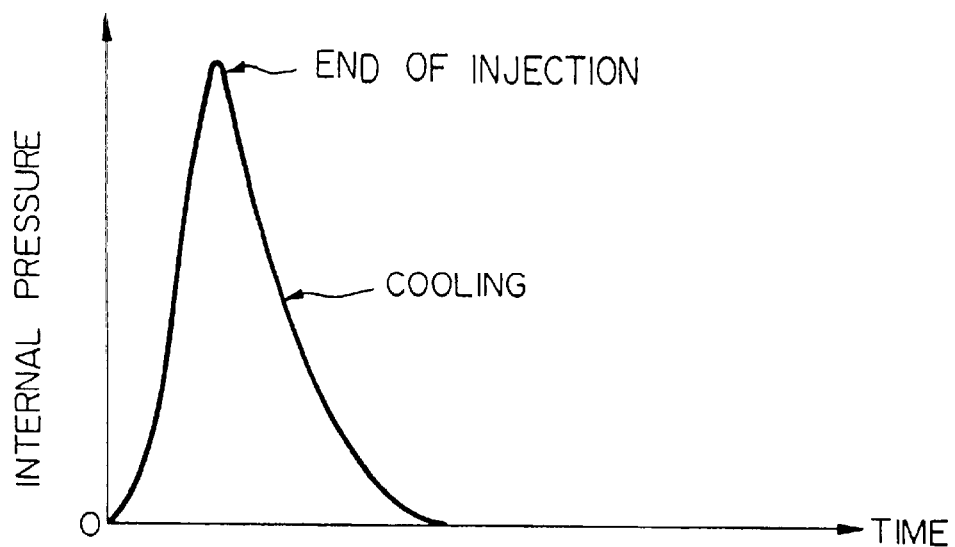
FIGS. 17A and 17B show the variation of the internal pressure of molten resin existing in a cavity occurring from the beginning to the end of cooling of the resin, and a timing for switching an air pressure fed via a vent hole respectively.
Figure 17B:
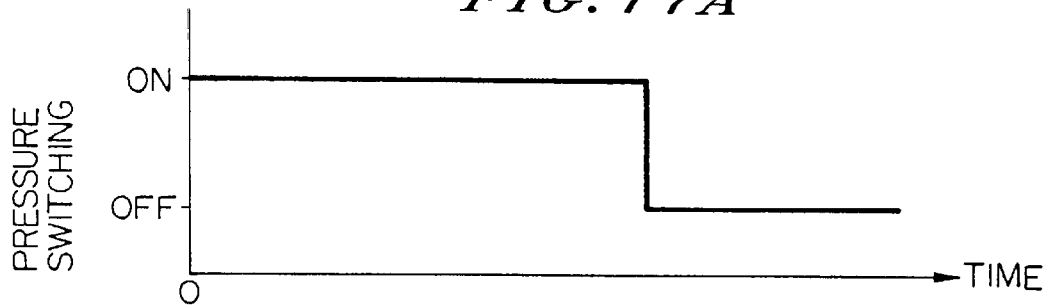

FIG. 17 shows how the internal pressure of the resin 20 varies from the time when the resin 20 begins to be injected into the cavity 17 to the time when it is fully cooled off. In the case where air under pressure is fed via the vent hole 18, its pressure is switched in a manner also shown in FIG. 17. As shown, in the illustrative embodiment, air is continuously fed even after the internal pressure of the resin 20 has been lowered to zero, generating air pressure in the vent hole portion. Experiments showed that the air pressure continuously generated, even after the drop of the resin pressure to zero, allows the sinking region to be surely controlled.

More specifically, the resin 20 remains in close contact with the mold 10 until the internal pressure of the resin 20 drops to zero, and sinking occurs thereafter. It is therefore necessary to apply air that has been pressured for some extra period of time after the internal pressure has dropped to zero. It was found that when the molding 1 is a lens, as shown and described, the sinking region can be controlled if the air pressure is continuously applied for at least 5 seconds more after the drop of the internal pressure of the resin 20 to zero. The air pressure should preferably be higher than the atmospheric pressure (about 0.1 MPa) inclusive, but lower than 2 MPa inclusive.

The first to tenth embodiments, shown and described above, achieve the following various unprecedented advantages.

(1) In a molding formed by an injection mold, in which a pressure difference or an air pressure is generated between mirror surface portions corresponding to the mirror surfaces of a molding material and a vent hole portion corresponding to a vent hole in order to cause the material to sink, a step is formed in a cavity between the vent hole and a mirror surface portion. When the material or resin is cooled, the step prevents the resin from contracting over the step and thereby guarantees adhesion of the portions of the material other than a surface expected to sink and the mold. This prevents sinking from proceeding over the step and thereby confines it to a region delimited by the step.

(2) The step is provided on the surface of the molding facing the vent hole, so that the sinking region can be confined to such a surface.

(3) Two steps are formed in such a manner as to isolate the vent hole and the mirror surface portions, so that sinking is prevented from extending to the mirror surfaces.

(4) The step is formed to surround the vent hole in order to prevent air from turning around to the surface portions. This allows sinking to be confined to the region delimited by the step and thereby prevents sinking from extending to the mirror surfaces.

(5) When the step is similar is configuration to the contour of the side of the molding facing of the vent hole, the sinking region can be controlled in the same ratio as the crosssectional area of the molding. This makes the internal strain and surface accuracy of the molding uniform and therefore enhances the accuracy of the molding.

(6) The sinking region can be controlled both when the step or steps of the molding are formed as projections and when they are formed as recesses.

(7) The step or steps prevent air from reaching the mirror surface portions via the vent hole and thereby protects the mirror surface portions from sinking.

(8) The steps configured to face each other at opposite longitudinal edges of each mirror surface obstruct air coming through the vent bole or any other portion of the mold. This also surely protects the mirror portions from sinking.

(9) The steps are each configured to surround the associated mirror surface portion. This prevents air from reaching the mirror surfaces more positively and prevents the sinking of the mirror surface portions more positively.

(10) The steps are tapered in order to confine the sinking to the area delimited by the steps. In addition, the tapering of the steps enhances the parting ability of the molding from the mold assembly.

(11) The steps are provided with a triangular or an arcuate cross-section in order to enhance the parting ability of the molding and to facilitate the formation of steps in the mold assembly.

(12) In a method of forming a molding of the kind described, an air pressure is continuously generated via the vent hole even after the internal pressure of the resin in the cavity has dropped to zero so as to control the sinking region more positively.

Eleventh Embodiment

Figure 18:
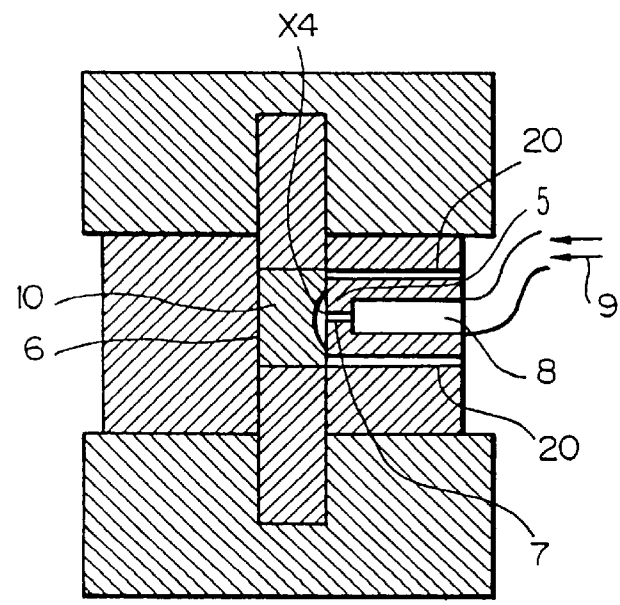
FIG. 18 is a cross-sectional view of an injection mold assembly representative of an eleventh embodiment of the present invention.
Figure 19:
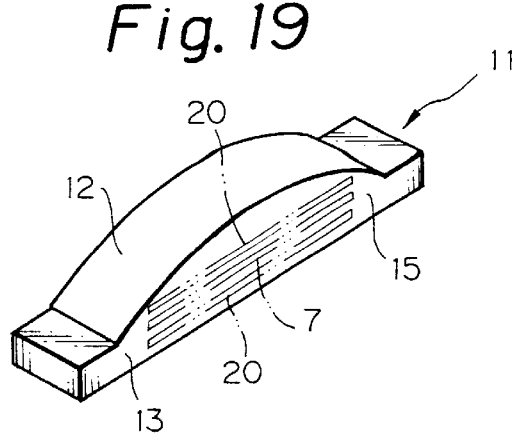
FIG. 19 is a perspective view showing a positional relation between a vent hole and an exhaust hole included in the eleventh embodiment.

FIG. 18 shows an injection mold assembly representative of an eleventh embodiment of the present invention. As shown, a sink insert 5 is located at a position where sinking is expected to occur. The sink insert 5 is formed with a vent hole 7, a bore 8 communicating with the vent hole 7, and a pair of exhaust holes 20 positioned above and below the vent hole 7 and the bore 8, respectively. FIG. 19 shows a positional relationship between the vent hole 7 and the exhaust holes 20.

In the illustrative embodiment, just after molten resin or molten molding material 10 has been injected into a cavity 6, it is difficult for air 9, fed under pressure via the vent hole 7, to enter the cavity 6. The internal pressure of the resin 10 sequentially decreases as the resin 10 is cooled. When the pressure of the resin 10 decreases below the pressure of the compressed air 9 delivered to the vent hole 7, the air 9 begins to flow into the cavity 6 via the vent hole 7. As a result, the portion of the resin 10 corresponding to one side 15 of a molding 11 as shown in FIG. 19 and facing the vent hole 7, begins to sink (X4) away from the inner periphery of the cavity 6. The compressed air 9, introduced into the cavity 6, hits against the exhaust holes 20. That is, the compressed air 9 is prevented from turning around to the upper surface 12 and lower surface 13 of the molding 11, which should turn out to be mirror surfaces. If desired, a machine for forced exhaustion may be connected to the bore 8 in order to promote more effective discharge of the compressed air 9. When the mold assembly is used to form, e.g., a lens of resin applicable to an image forming apparatus or similar optical apparatus, the exhaust holes 20 should be 0.001 mm to 0.5 mm wide (vertical dimension in FIG. 18). With such a width, the exhaust holes 20 allow a minimum of resin to enter therein and thereby frees the molding 11 from burrs.

Twelfth Embodiment

Figure 20:
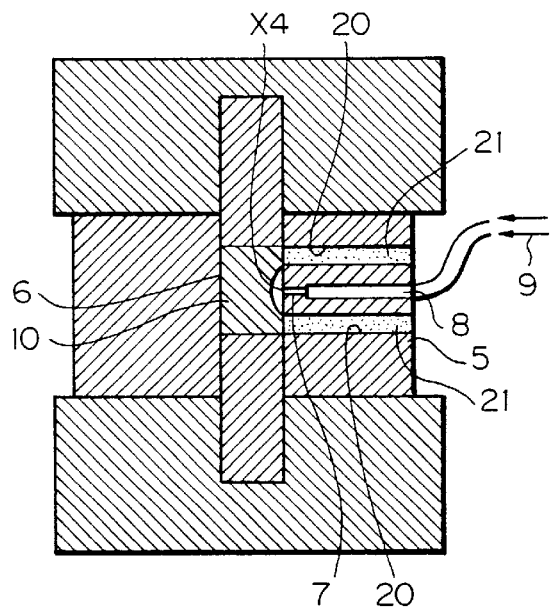
FIG. 20 is a cross-sectional view of an injection mold assembly representative of a twelfth embodiment of the present invention.

FIG. 20 shows a mold representative of a twelfth embodiment of the present invention. As shown, this embodiment is identical with the eleventh embodiment except that the exhaust holes 20 are formed by porous member 21.

Thirteenth Embodiment

Figure 21:
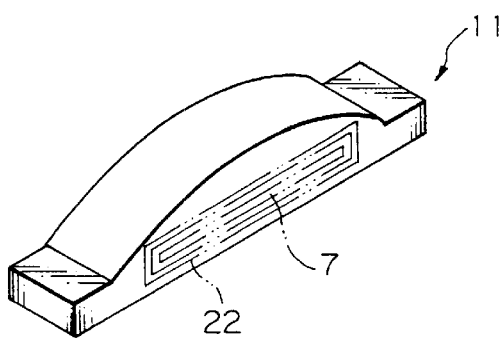
FIG. 21 is a perspective view showing the position of an exhaust hole formed in an injection mold assembly representative of a thirteenth embodiment of the present invention.

FIG. 21 shows the position of an exhaust hole formed in an injection mold assembly representative of a thirteenth embodiment of the present invention. As shown, a continuous exhaust hole 22 is formed to surround the vent hole 7. The exhaust hole 22 may also be formed by the porous member 21 in order to simplify the configuration of the insert 5, as shown in FIG. 20.

Fourteenth Embodiment

Figure 22:
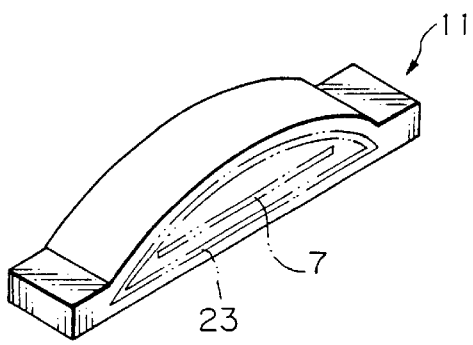
FIG. 22 is a perspective view showing a modification of the thirteenth embodiment.

FIG. 22 shows a fourteenth embodiment of the present invention which is a modification of the thirteenth embodiment. As shown, this embodiment is identical with the thirteenth embodiment except that an exhaust hole 23 is similar in configuration to the contour of the side of the molding 11, which is expected to sink. Again, the exhaust hole 23 may be formed by the porous member 21 in order to simplify the configuration of the insert 5, as shown in FIG. 20.

The eleventh to the fourteenth embodiments, shown and described above, have the following unprecedented advantages.

(1) At least one exhaust hole is formed in the vicinity of a vent hole used to feed air under pressure for causing sinking. The exhaust hole discharges air, which causes sinking to occur in the vicinity of the vent hole, to the outside of a mold assembly before it reaches portions expected to form mirror surfaces. Therefore, air is prevented from reaching portions other than the portion expected to sink, so that the shape of the mold assembly is surely transferred to the other portions of the molding.

(2) A single exhaust hole surrounds the vent hole and discharges air, which causes sinking to occur smoothly, to the outside of the mold assembly. This guides air only to the portion of the molding expected to sink more positively.

(3) The exhaust hole or holes are formed by a porous member. Therefore, particularly when a single exhaust hole surrounds the vent hole, the porous member, formed with the holes, is simple in structure.

(4) Air is forcibly discharged via the exhaust holes so that air, which causes sinking to occur in the cavity, can be discharged more smoothly.

(5) The exhaust hole has an opening width as small as 0.001 mm to 0.5 mm and prevents a molding material from entering it. This frees the resulting molding from burrs.

Fifteenth Embodiment

Figure 23A:
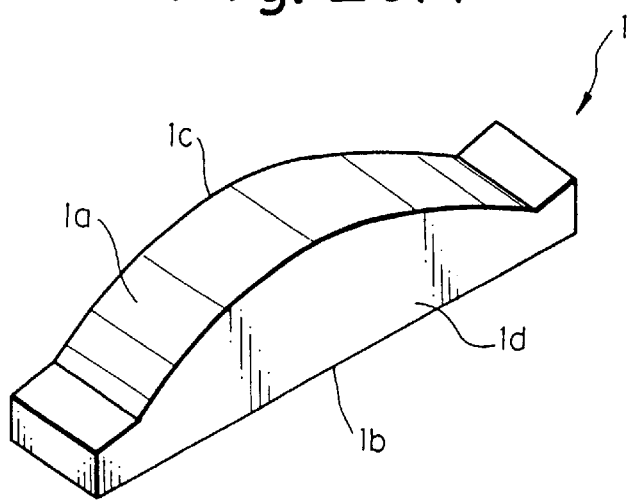
FIG. 23A is a perspective view of a plastic molding representative of a fifteenth embodiment of the present invention.
Figure 23B:
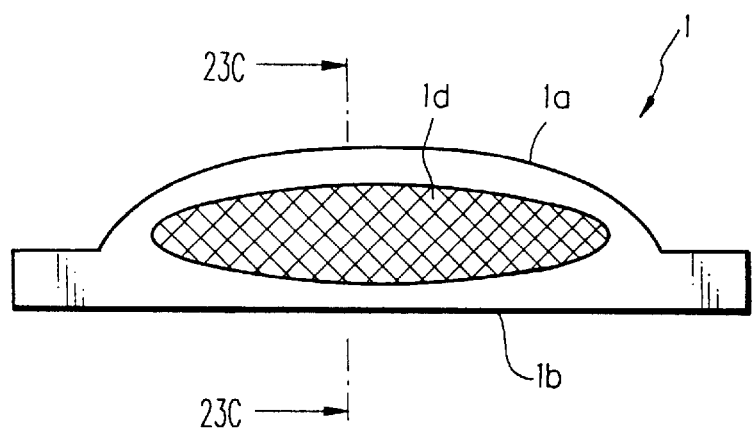
FIG. 23B is a side elevation showing a sinking region to occur in the fifteenth embodiment.
Figure 23C:
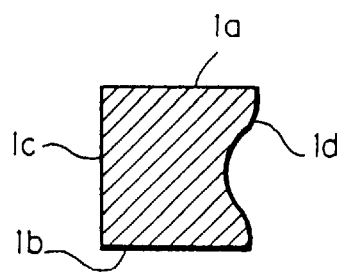
FIG. 23C is a cross-sectional view taken along line A—A of FIG. 23B.

FIGS. 23A–23C show a plastic molding formed by a method representative of a fifteenth embodiment of the present invention. The molding may be implemented, not only as a lens, but also as a mirror, prism or similar optical device. As shown, a molding 1 has mirror surfaces or transfer surfaces 1a and 1b on its top and bottom, respectively. In addition, the molding 1 has a reference surface or non-transfer surface 1c at one side and a sink surface or non-transfer surface 1d at the other side. The reference surface 1c is to be mounted to another part, while the sink surface 1d is expected to sink.

Reference will be made to FIGS. 24A, 24B, 25A, and 25B for describing a molding apparatus 2 for producing the above molding 1. As shown, the molding apparatus 2 includes a stage 3 loaded with a lower mold 4. An upper mold 5 is positioned above the lower mold 4 and is movable into and out of contact with the lower mold 4 by being driven by a clamping device (not shown).

A plurality (four in the embodiment) of inserts are interposed between the lower mold 4 and the upper mold 5 and constitute cavity inserts. Specifically, mirror inserts 6 and 7 face each other and are formed with mirror surfaces 6a and 7a, respectively, for forming the mirror surfaces 1a and 1b, respectively, of the molding 1. A reference insert 8 and a sink insert 9 face each other at both sides of the mirror inserts 6 and 7 and are formed with non-transfer surfaces 8a and 9a, respectively, in order to form the reference surface 1c and sink surface 1d, respectively. The surfaces of the inserts 6–9 form a cavity 10. The non-transfer surfaces 8a and 9a are each formed with fine irregularities or undulations.

Figure 24A:
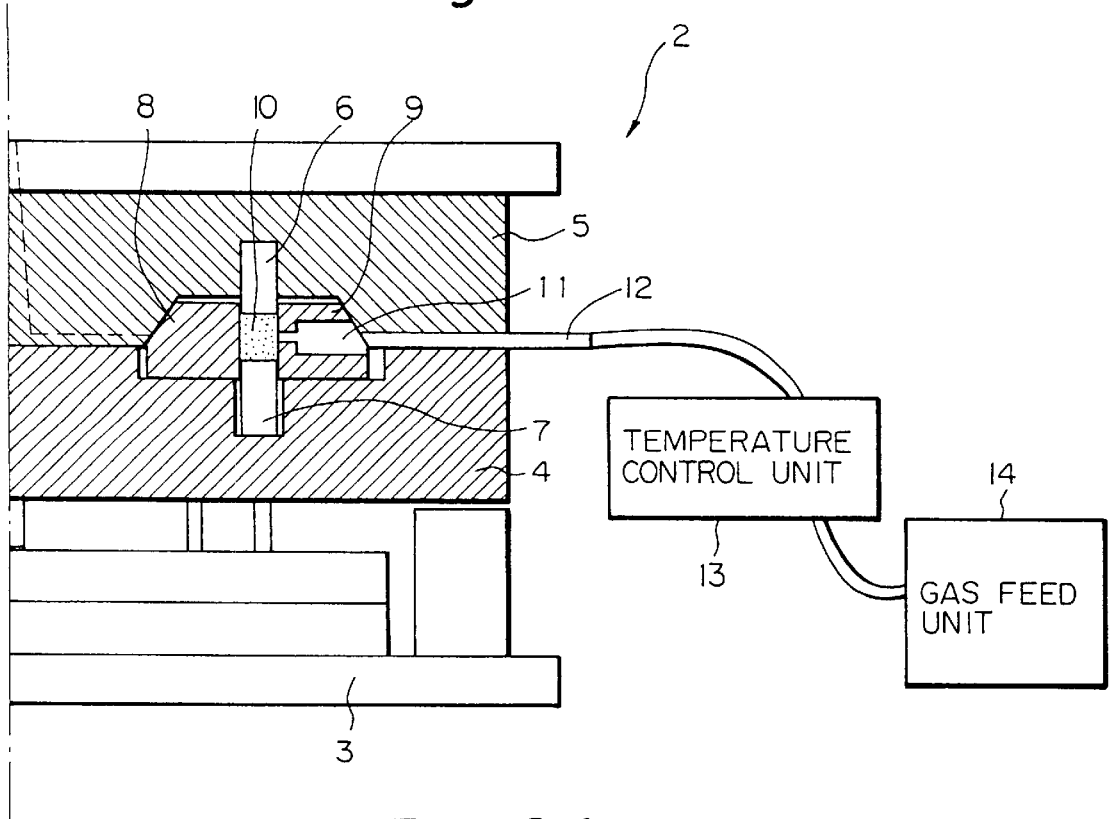
FIG. 24A is a cross-sectional view showing one half of the fifteenth embodiment.
Figure 24B:
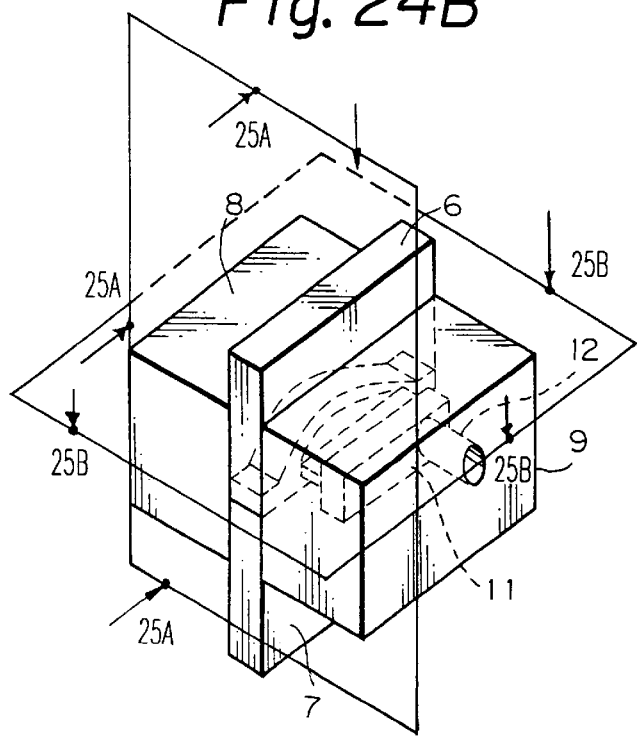
FIG. 24B is a perspective view showing cavity inserts included in the fifteenth embodiment.
Figure 25A:
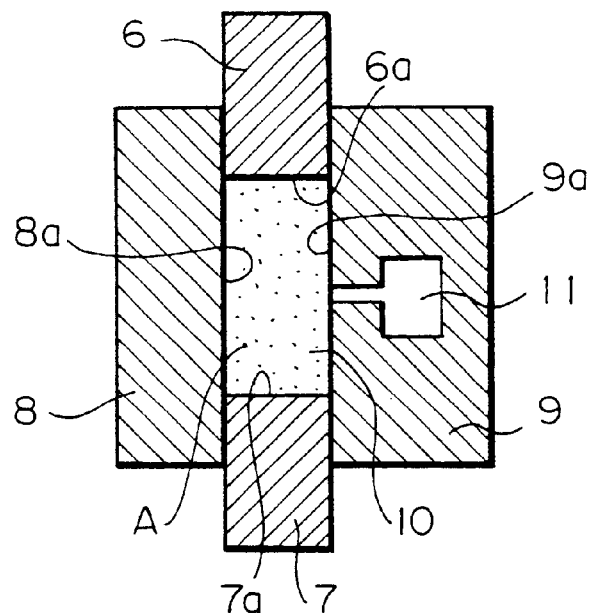
FIG. 25A is a cross-sectional view as seen in a direction X of FIG. 24B.
Figure 25B:
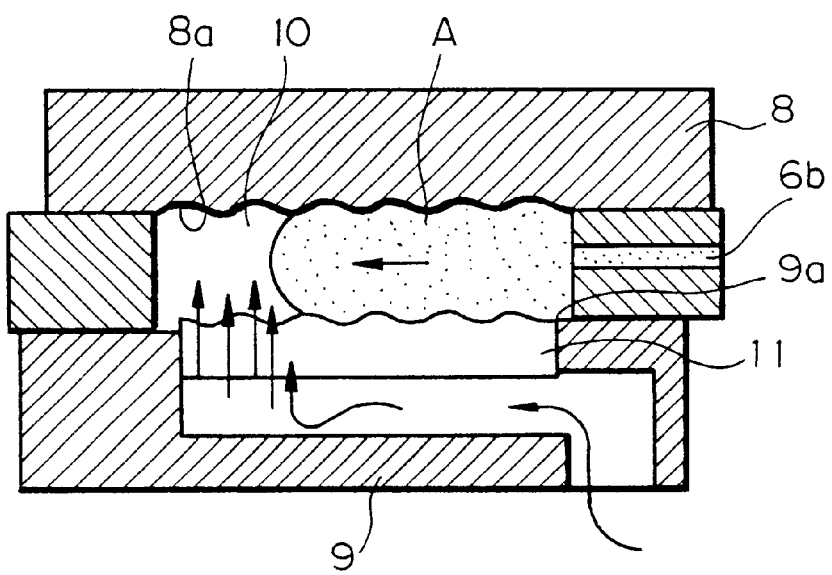
FIG. 25B is a cross-sectional view as seen in a direction Y of FIG. 24B.
Figure 26:
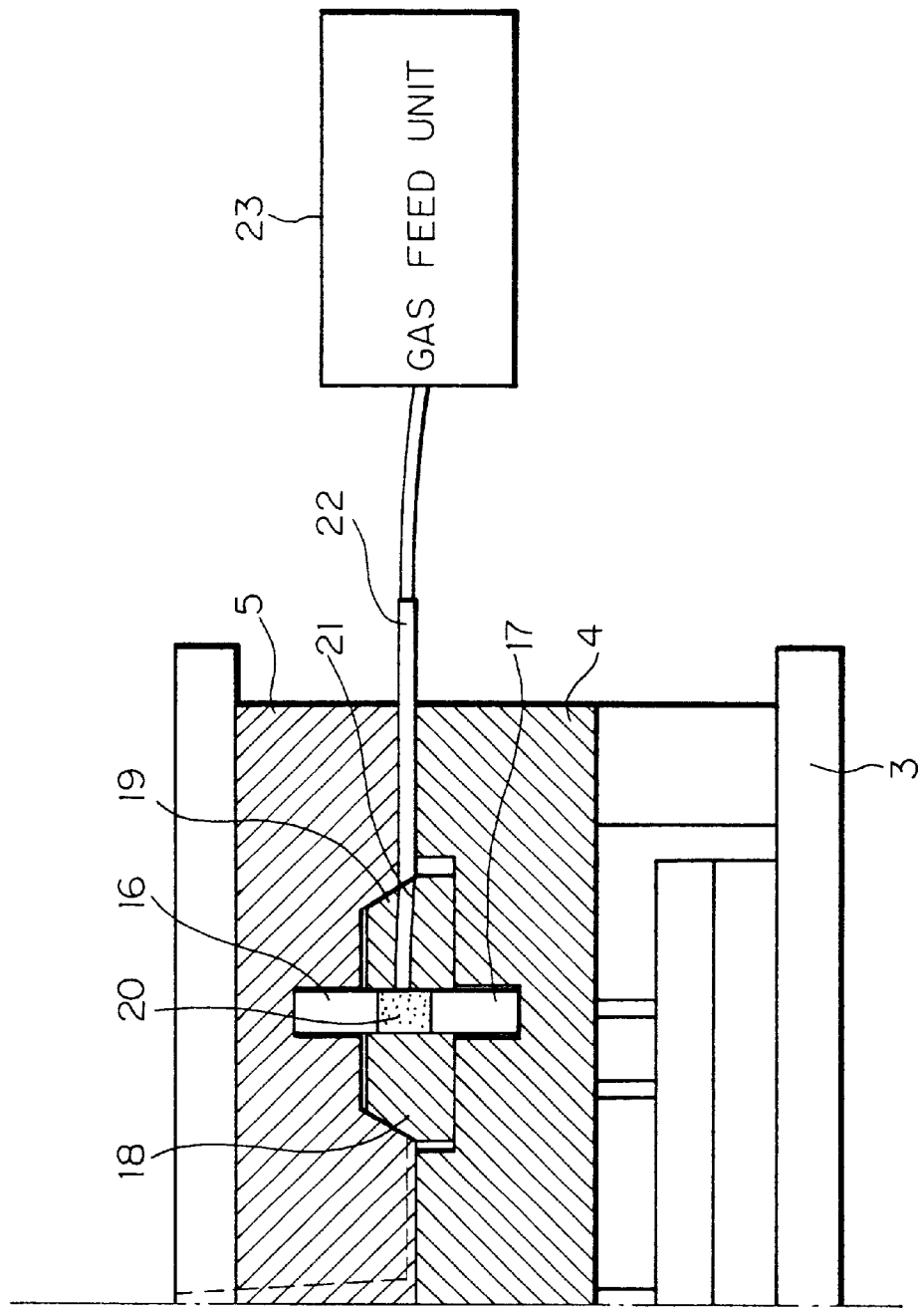
FIG. 26 is a cross-sectional view showing a method and an apparatus for producing a plastic molding representative of a sixteenth embodiment of the present invention.
Figure 27A:
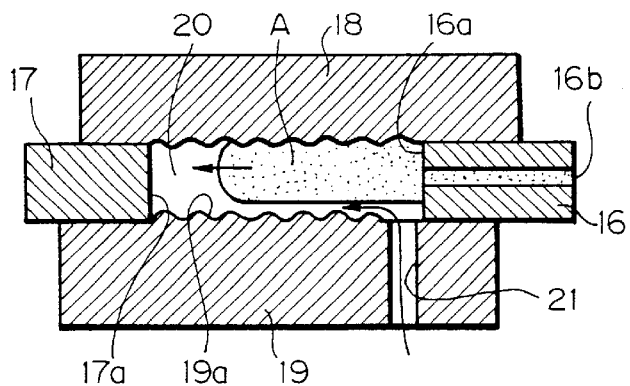
FIGS. 27A–27D show a specific procedure available with the sixteenth embodiment.
Figure 27B:
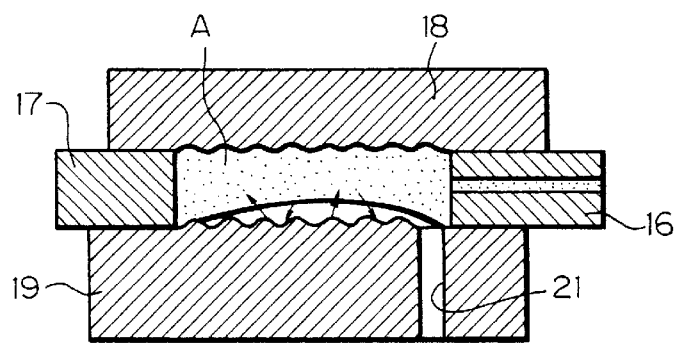
Figure 27C:
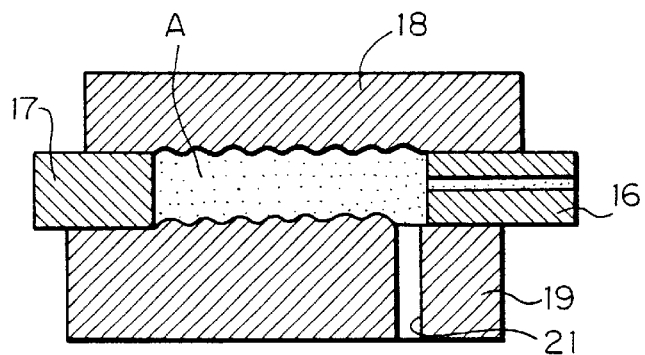
Figure 27D:
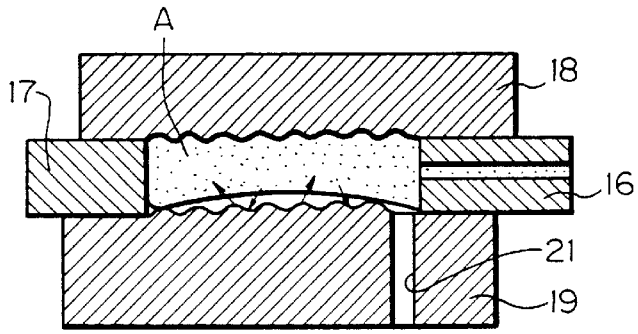
Figure 28A:
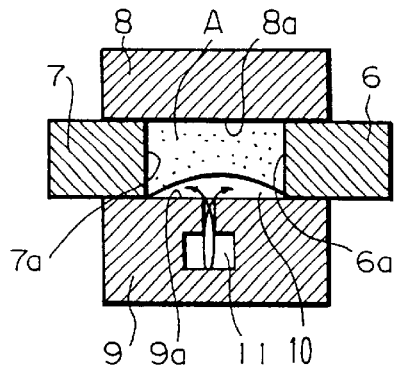
FIGS. 28A–28D show another specific procedure available with the sixteenth embodiment.
Figure 28B:
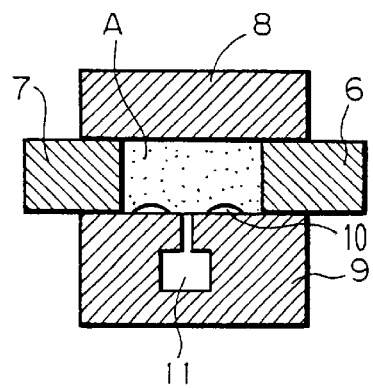
Figure 28C:
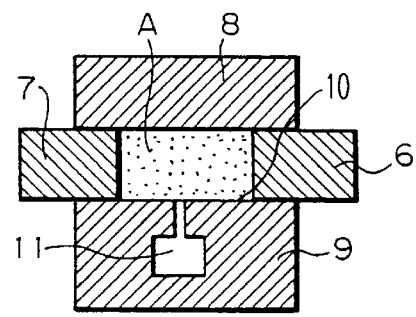
Figure 28D:
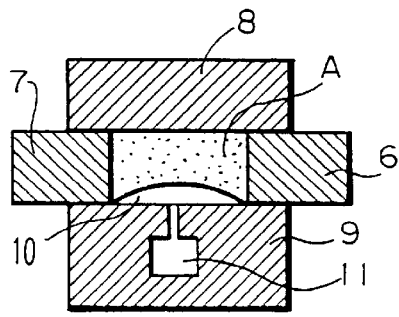

It is noted that FIGS. 24A and 24B show only one half of the molding apparatus 2. The other half is also provided with cavity inserts identical with the cavity inserts 6–9. A sprue (not shown) is formed in the upper mold 5, while a sprue 6b is formed in the mirror insert 6 and is communicable to the sprue of the upper mold 5. An injection molding machine (not shown) feeds molten resin to the cavity 10 via the sprue of the upper mold 5 and the sprue 6b.

A vent hole 11 is formed in the sink insert 9. The vent hole 1 1 is open to the cavity 10 at one end and connected to a feed tube 12 at the other end. The feed tube 12 is interposed between the lower mold 4 and the upper mold 5 and connected to a gas feed unit 14 via a temperature control unit 13. A gas (e.g., air compressed to a preselected pressure by the gas feed unit 14 and controlled to a preselected temperature by the temperature control unit) is fed via the feed tube 12.

In the illustrative embodiment, molten resin, heated above its softening point, is injected into the cavity 10 of the mold assembly heated to a temperature lower than the softening point of the resin. Therefore, the temperature control unit 13 controls the gas to a temperature about 3° C. lower than the temperature of the mirror inserts 6 and 7 and reference insert 8. It follows that the temperature of the gas, fed from the feed tube 11 to the sink surface 1d, is lower than the temperature of the mirror surfaces 1a and 1b and reference surface 1c. The lower mold 4 and upper mold 5 surrounding the inserts 6–9 are each provided with a temperature control mechanism, including a heater and an oil cooler (not shown). The heater and oil cooler heat and cool, respectively, the associated molds 4 and 5, respectively, and therefore, the inserts 6–9.

In the illustrative embodiment, the temperature control unit 13 and gas feed unit 14 constitute a feeding device, and also constitute gas feeding means in combinat ion with the vent hole 11.

The operation of the above-described arrangement will be discussed hereinafter. When a lens or similar plastic optical element is produced by conventional in section molding, molding conditions allowing the entire area to be transferred (i.e., allowing the internal pressure of the molding to drop substantially to zero at the time of take-out) are set up. However, because molten resin is sharply cooled as soon as it is introduced into a mold, the resulting temperature distribution, pressure distribution, density distribution and so forth disturb the shape of the molding. This, coupled with the internal strain (deflection) of the resin, adversely influences the optical characteristic of the molding. Although during the transfer of the mold configuration, internal strain and deformation may be reduced if a molding is caused to partly sink, it is extremely difficult to specify the part of a molding to sink. This embodiment is significant in that it can specify the part of a molding to sink, as follows.

While the mold assembly is held at a temperature lower than the softening point of resin, molten resin A, heated above its softening point, is injected into the cavity 10. Then, a resin pressure is caused to act on the transfer surfaces 6a and 7a of the mirror inserts 6 and 7, respectively. At the same time as the injection of the resin A, a cool gas, compressed to a preselected pressure by the air feed unit 14 and controlled to a preselected temperature by the temperature control unit 13, is fed to the sink surface Id via the vent hole 11. The feed of the gas is continued until the resin A has been fully injected into the cavity 10. At this instant, the sink surface 1d, lower in temperature than the mirror surfaces 1a and 1b, solidifies first and increases its viscosity. This makes it difficult for the sink surface 1d to remain in contact with the non-transfer surface 9a of the sink insert 9 before the end of the injection of the resin A. After the injection of the resin A and the subsequent stop of the feeding of the cool gas, the cavity 10 is caused to dwell at a preselected pressure and cooled. As soon as the pressure inside the cavity 10 drops substantially to zero, the upper mold 5 is pulled away or separated from the lower mold 4. Subsequently, the resulting molding 1 is taken out of the cavity 10.

The sink surface 1d of the molding 1 obtains a parting ability earlier than the other surface of the same. As a result, the sink surface Id begins to sink earlier than the other surfaces contacting the inserts 6–8. This successfully prevents the mirror surfaces 1a and 1b from sinking and thereby allows the desired mirror surfaces 1a and 1b to be faithfully transferred to the molding 1 in a short molding cycle.

Moreover, the sink surface Id is held at a temperature lower than the temperature of the resin A from the end of the resin injection to the beginning of cooling. Consequently, a temperature difference does not occur between the mirror surfaces 1a and 1b and the sink surface 1d during cooling, so that an internal strain is prevented from remaining in the molding 1 after the opening of the mold assembly. This not only prevents the accuracy of the mirror surfaces Ia and 1b from decreasing, but also prevents the entire molding 1 from deforming.

In addition, the gas feeding means can be implemented only if the vent hole 11 is formed in the sink insert 9 and connected to both the temperature control unit 13 and gas feed unit 14. The mold assembly is therefore simple in construction.

Sixteenth Embodiment

Referring to FIGS. 26, 27A–27D, and 28A–28D, a method and an apparatus for producing a plastic molding representative of a sixteenth embodiment of the present invention will be described. A molding to be provided by this embodiment is identical in configuration with the molding of the fifteenth embodiment and will be described with reference to FIGS. 23A–23C. Structural elements identical with the elements of the fifteenth embodiment are designated by identical reference numerals and will not be described specifically in order to avoid redundancy.

As shown in FIGS. 26 and 27A–27D, a plurality of (four in the embodiment) inserts are interposed between the lower mold 4 and the upper mold 5 and constitute cavity inserts. Specifically, mirror inserts 16 and 17 face each other and are formed with mirror surfaces 16a and 17a, respectively, for forming the mirror surfaces 1a and 1b, respectively, of the molding 1. A reference insert 18 and a sink insert 19 face each other at both sides of the mirror inserts 16 and 17 and are formed with non-transfer surfaces 18a and 19a, respectively, in order to form the reference surface 1c and sink surface 1d, respectively, of the molding 1. The surfaces of the inserts 16–19 form a cavity 20. The non-transfer surfaces 18a and 19a are each formed with fine irregularities.

A sprue (not shown) is formed in the upper mold 5, while a sprue 16b is formed in the mirror insert 16 and is capable of communication with to the sprue (not shown) in the upper mold 5. An injection molding machine (not shown) injects molten resin into the cavity 20 via the sprue (not shown) of the upper mold 5 and the sprue 16b. A vent hole 21 is formed in the sink insert 19. The vent hole 21 is open to the cavity 20 at one end and connected to a feed tube 22 at the other end. The feed tube 22 is interposed between the lower mold 4 and the upper mold 5.

The feed tube 22 is connected to a gas feed unit 23. The gas feed unit 23 feeds a gas, e.g., air compressed to a preselected pressure to between the sink surface 1d and the transfer surface 19a, via the feed tube 22 and vent hole 21. In this embodiment, the gas feed unit 23 constitutes a feeding device and constitutes gas feeding means in combination with the vent hole 21 and feed tube 22.

The operation of the illustrative embodiment will be described with reference to FIGS. 27A–27D. As shown, while the mold assembly is held at a temperature lower than the softening point of resin, molten resin A, heated above its softening point, is injected into the cavity 20. Then, a resin pressure is caused to act on the transfer surfaces 16a and 17a of the mirror inserts 16 and 17, respectively. At the same time as the injection of the resin A, a gas, compressed to a preselected pressure by the air feed unit 23, is fed to between the sink surface 1d and the nontransfer surface 19a. The feed of the gas is continued until the resin A has been fully injected into the cavity 20 (see FIGS. 27A and 27B). At this instant, a gas layer is formed between the non-transfer surface 19a and the sink surface 1d, making it difficult for the sink surface 1d to remain in contact with the non-transfer surface 19a before the end of the injection of the resin A.

After the injection of the resin A and the following stop of feed of the gas, the cavity 20 is caused to dwell at a preselected pressure and cooled. As a result, the gas layer between the sink surface 1d and the non-transfer surface 19a is compressed by the internal pressure of the resin A, but remains between them (see FIG. 27C). Such residual gas expands as the internal pressure approaches zero, separating the sink surface 1d from the non-transfer surface 19a. When the internal pressure reaches zero, the non-transfer surface 19a obtains a parting ability earlier than the other surfaces. When the pressure inside the cavity 20 drops substantially to zero, the upper mold 5 is released from the lower mold 4. Subsequently, the molding 1 is taken out of the cavity 20.

In this manner, the sink surface I d begins to sink earlier than the other surfaces contacting the inserts 16–18. This successfully prevents the mirror surfaces 1a and 1b from sinking and thereby allows the desired mirror surfaces 1a and 1b to be faithfully transferred to the molding 1 in a short molding cycle. Moreover, the gas layer remains between the sink surface Id and the non-transfer surface 19a until the cooling step begins after the injection of the molten resin, preventing the pressure difference, between the mirror surfaces 1a and 1b and the sink surface 1d, from increasing during cooling. Consequently, the internal strain of the molding 1 is prevented from remaining, after the opening of the mold assembly. This not only prevents the accuracy of the mirror surfaces 1a and 1b from decreasing, but also prevents the entire molding 1 from deforming.

This embodiment may be practiced with the same configuration as the fifteenth embodiment, as follows. The gas fed from the gas feed unit 23 is controlled to substantially the same temperature as the mold by the temperature control unit 31 shown in FIG. 15. In this case, as shown in FIGS. 28A–28D, while the mold assembly is held at a temperature lower than the softening point of resin, molten resin, heated above its softening point, is injected into the cavity 20. Then, a resin pressure is caused to act on the transfer surfaces 6a and 7a of the mirror inserts 6 and 7, respectively. At the same time as the injection of the resin, the gas, compressed to a preselected pressure by the gas feed unit 23, is fed to between the sink surface 1d and the non-transfer surface 19a. The feed of the gas is continued until the resin A has been fully injected into the cavity 20 (see FIGS. 28A and 28B). At this instant, a gas layer is formed between the non-transfer surface 19a and the sink surface 1d, making it difficult for the sink surface 1d to remain in contact with the non-transfer surface 19a before the end of the injection of the resin.

After the injection of the resin and the subsequent stop of feed of the gas, the cavity 20 is caused to dwell at a preselected pressure and cooled. As a result, the gas layer, between the sink surface 1d and the non-transfer surface 19a, is compressed by the internal pressure of the resin, but remains between them (see FIG. 28C). The residual gas expands as the internal pressure approaches zero, separating the sink surface 1d from the non-transfer surface 19a. When the internal pressure reaches zero, the non-transfer surface 19a obtains a parting ability earlier than the other surfaces (see FIG. 28D). When the pressure inside the cavity 20 drops substantially to zero, the upper mold 5 is released from the lower mold 4. Subsequently, the molding 1 is taken out of the cavity 20.

Seventeenth Embodiment

Figure 29:
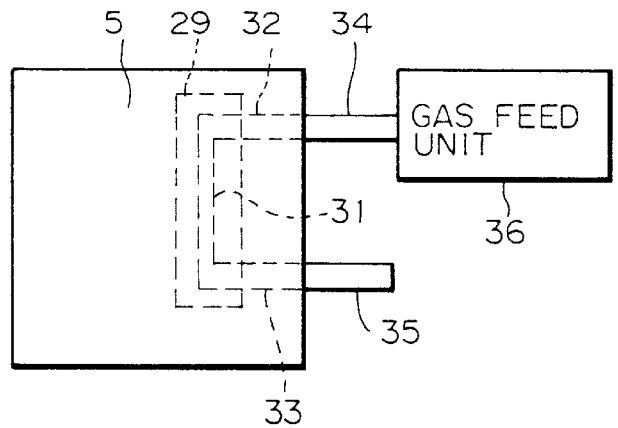
FIG. 29 is a top plan view showing a method and an apparatus for producing a plastic molding representative of a seventeenth embodiment of the present invention.
Figure 30A:
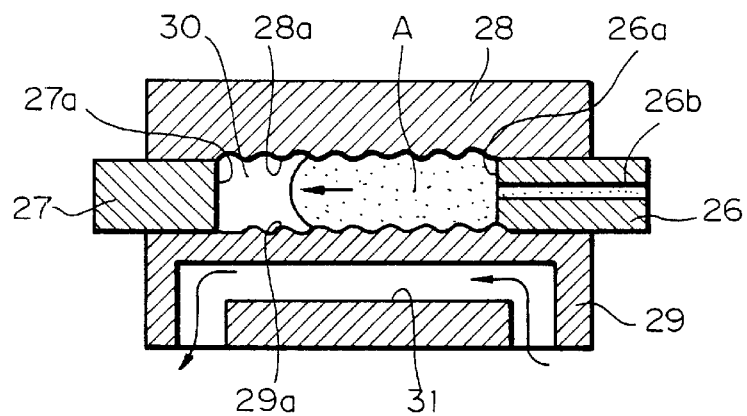
FIGS. 30A and 30B show another specific procedure available with the seventeenth embodiment.
Figure 30B:
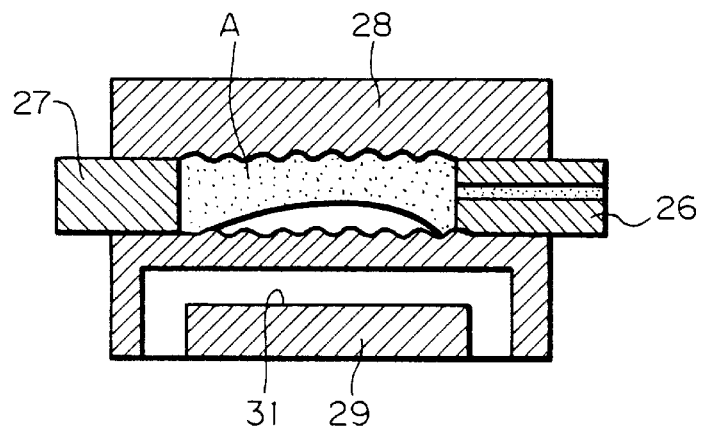
Figure 32A:
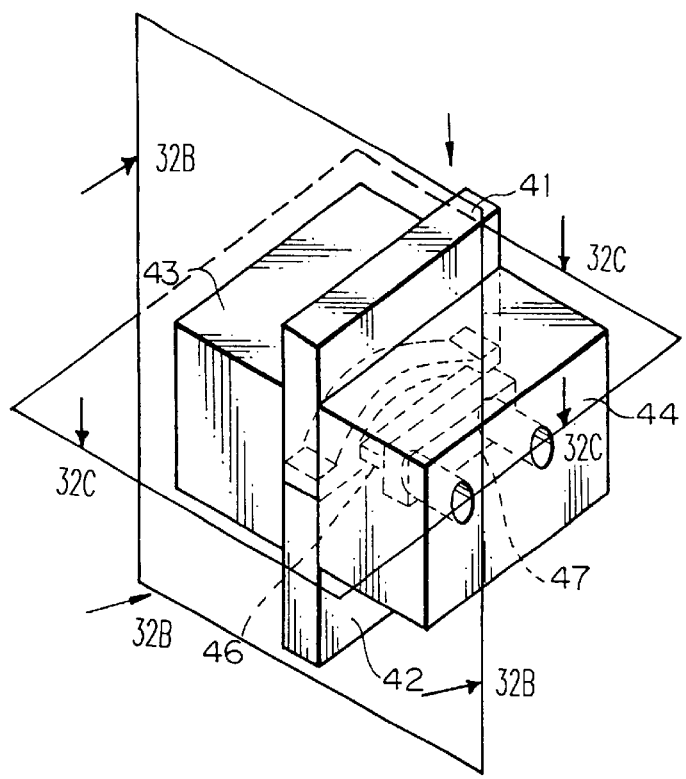
FIG. 32A is a perspective view showing cavity inserts included in the eighteenth embodiment.
Figure 32B:
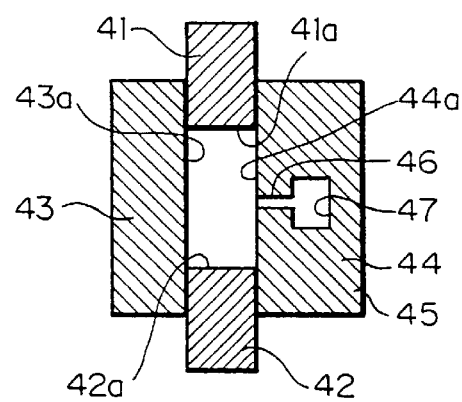
FIG. 32B is a cross-sectional view as seen in a direction X of FIG. 32A.
Figure 32C:
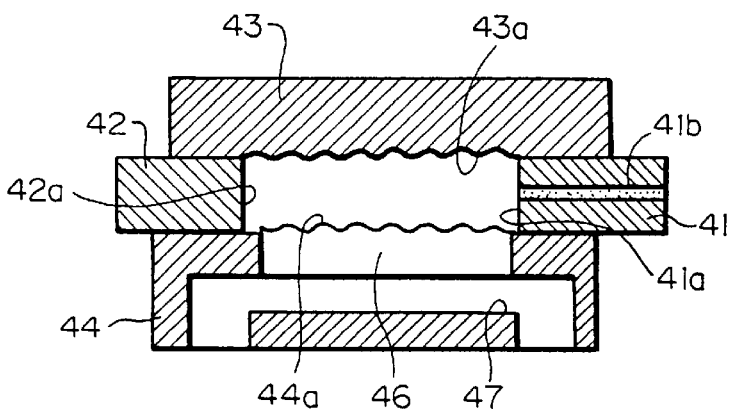
FIG. 32C is a cross-sectional view as seen in a direction Y of FIG. 32A.

A method and an apparatus for producing a plastic molding representative of a seventeenth embodiment of the present invention will be described with reference to FIGS. 29, 30A, and 30B. A molding to be produced by this embodiment is identical in configuration with the molding of the fifteenth embodiment and will be described in reference to FIGS. 23A–23C. Structural elements identical with the elements of the fifteenth embodiment will be designated by identical reference numerals and will not be described specifically in order to avoid redundancy.

As shown, a plurality of (four in the embodiment) inserts are interposed between the lower mold 4 and the upper mold 5 and constitute cavity inserts. Specifically, mirror inserts 26 and 27, which face each other, are formed with mirror surfaces 26a and 27a, respectively, for forming the mirror surfaces 1a and 1b, respectively, of the molding 1. The surfaces of the inserts 16–19 form a cavity 30. The non-transfer surfaces 28a and 29a are each formed with fine irregularities.

A sprue (not shown) is formed in the upper mold 5, while a sprue 26b is formed in the mirror insert 26 and is capable of communication with the sprue (not shown) of the upper mold 5. An injection molding machine (not shown) injects molten resin into the cavity 30 via the sprue (not shown) of the upper mold 5 and the sprue 26b. A vent hole 31 is formed in the sink insert 29. One end of the vent hole 31 communicates with a gas feed unit 36 via a vent hole 32 formed in the lower mold and a feed tube 34. The other end of the vent hole 31 communicates with the outside of the mold assembly via an exhaust tube 35.

The gas feed unit 36 feeds gas, e.g., air controlled to a preselected pressure and a preselected temperature to the vent hole 31, via the feed tube 34 and vent hole 32, and then discharges it via the vent hole 33 and exhaust tube 35. The gas therefore cools the non-transfer surface 29a of the sink insert 29.

In the illustrative embodiment, molten resin, heated above its softening point, is injected into the cavity 30 of the mold heated to a temperature lower than the softening point of the resin. Therefore, a temperature control unit 36 controls the temperature of the gas to a temperature about 3° C. lower than the temperature of the mirror inserts 26 and 27 and reference insert 28. It follows that the temperature of the gas, fed from the vent hole 31 to the sink surface 29, is lower than the temperature of the mirror surface 26a and 27a and non-transfer surface 28a.

In this embodiment, the gas feed unit 36, feed tube 34, vent holes 31–33, and exhaust tube 35 constitute cooling means.

In operation, before the injection of molten resin, a cool gas, controlled to a preselected pressure and a preselected temperature, is fed from the gas feed unit 36 to a non-transfer surface 29a via the vent hole 31 so as to cool the non-transfer surface 29a. Then, while the mold assembly is held at a temperature lower than the softening point of resin, molten resin A, heated above its softening point, is injected into the cavity 30. Subsequently, a resin pressure is caused to act on the transfer surfaces 26a and 27a of the mirror inserts 26 and 27, respectively. The feed of the cool gas is continued until the resin A has been fully injected into the cavity 30. At this instant, the sink surface 1d, lower in temperature than the mirror surfaces 1a and 1b, solidifies first and increases its viscosity, making it difficult for the sink surface 29a to remain in contact with the non-transfer surface 29a before the end of the injection of the resin A. After the injection of the molten resin and the subsequent stop the of feeding of the cool gas, the cavity 30 is caused to dwell at a preselected pressure and cooled. When the pressure inside the cavity 30 drops substantially to zero, the upper mold 5 is released from the lower mold 4. Subsequently, the molding 1 is taken out of the cavity 20. This embodiment achieves the same advantages as the fifteenth embodiment.

Eighteenth Embodiment

A method and an apparatus for producing a plastic molding representative of a seventeenth embodiment of the present invention will be described with reference to FIGS. 31, 32A–32C, 33A, 33B, 34A–34C, and 35. A molding to be produced by this embodiment is identical in configuration with the molding of the fifteenth embodiment and will be described with reference to FIGS. 23A–23C. Structural elements identical with the elements of the fifteenth embodiment will be designated by identical reference numerals and will not be described specifically in order to avoid redundancy.

As shown, a plurality of (four in the embodiment) inserts are interposed between the lower mold 4 and the upper mold 5 and constitute cavity inserts. Specifically, mirror inserts 41 and 42, which face each other, are formed with mirror surfaces 41a and 42a, respectively, for forming the mirror surfaces 12a and 1b, respectively, of a molding 1. A reference insert 43 and a sink insert 44 face each other at both sides of the mirror inserts 41 and 42 and are formed with non-transfer surfaces 43a and 44a, respectively, in order to form the reference surface 1c and sink surfaces 1d, respectively. The surfaces of the insert 41–44 form a cavity 45. The nontransfer surfaces 44a and 45a are each formed with fine irregularities.

A sprue (not shown) is formed in the upper mold 5, while a sprue 41b is formed in the mirror insert 41 and is capable of communication with the sprue (not shown) of the upper mold 5. An injection molding machine (not shown) injects molten resin into the cavity 45 via the sprue (not shown) of the upper mold 5 and the sprue 41b. A vent hole 46 is formed in the sink insert 44. The vent hole 46 is open to the cavity 45 at one end and connected to a bore 47 at the other end. The bore 47 communicates with a flow rate control unit 50 via a vent hole 48, formed in the lower mold 4, and a feed tube 49. The flow rate control unit 50 is connected to a gas feed unit 53 via both a pressure control unit 51 and a temperature control unit 52.

The gas feed unit 53 constitutes a gas source. The temperature control unit 52 controls the temperature of a gas fed from the gas feed unit 53. The pressure control unit 51 controls the pressure of the gas fed from the gas feed unit 53. Further, the flow rate control unit 50 controls the flow rate of the gas fed from the gas feed unit 53. The vent hole 47 communicates with an exhaust valve 56 via a vent hole 54, formed in the lower mold 5, and an exhaust tube 55. The gas fed from the gas feed unit 53 to the vent hole 47 is either discharged to the outside, when the exhaust valve 56 is open, or is introduced into the cavity 45, when the valve 56 is closed.

In this embodiment, the flow rate control unit 50, pressure control unit 51, temperature control unit 52, and gas feed unit 53 constitute a feeding device. The feeding device constitutes gas feeding means in combination with the vent holes 46, 47, 48, and 54, feed tube 49, and exhaust valve 56.

The operation of the illustrative embodiment will be described with reference to FIGS. 33A, 33B, and 34A–34C. Briefly, this embodiment is characterized in that a step of pressing the sink surface 1d of molten metal with the gas is combined with at least one of a step of lowering the temperature of the sink surface 1d below the temperature of the mirror surfaces 1a and 1b, a step of forming a gas layer between the sink surface 1d and the sink insert 44, and a step of lowering the temperature of the sink insert 44 facing the sink surface 1d below the temperature of the mirror inserts 41 and 42. The following description will concentrate on the combination of all of such steps.

Figure 33A:
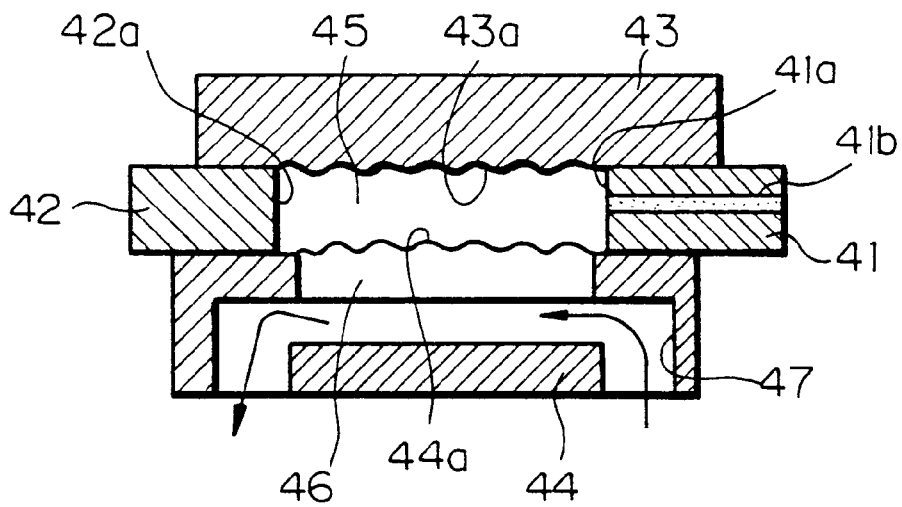
FIGS. 33A and 33B show another specific procedure available with the eighteenth embodiment.
Figure 33B:
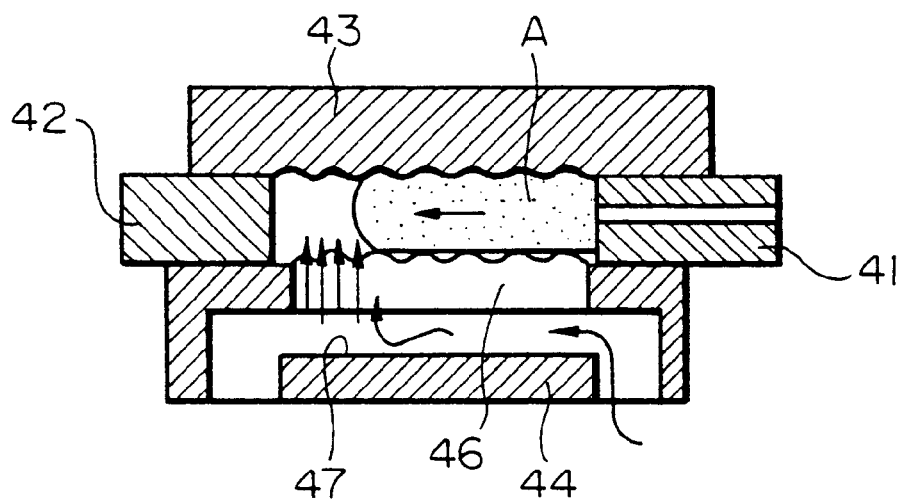
Figure 34A:
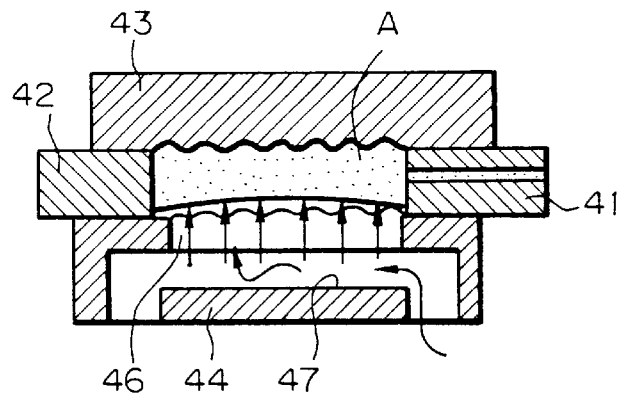
FIGS. 34A–34C show a procedure following the procedure of FIG. 32B.
Figure 34B:
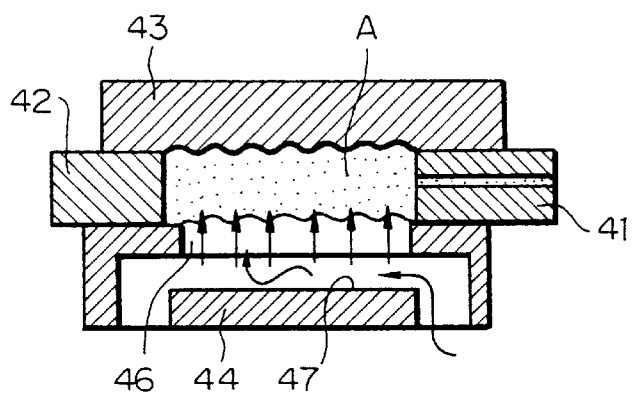
Figure 34C:
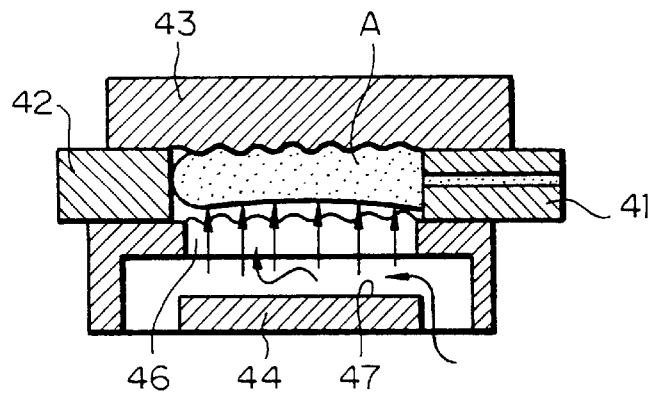

First, the exhaust valve 56 is opened to feed a small amount of gas to the vent hole 47 via the flow rate control unit 50, thereby cooling the sink insert 44 (see FIG. 33A). Specifically, the flow rate of the gas is selected so as to prevent the gas from entering the cavity 45. Otherwise, the gas would enter the cavity 45 and cool even the mirror surfaces 41 and 42. If desired, the temperature of the gas may be controlled in order to promote the effective cooling of the sink insert 44.

After the mold assembly has been heated to a temperature lower than the softening point of resin, but before molten resin, heated to a temperature above its softening point, is injected into the cavity 45, the flow rate unit 50 and pressure control unit 51, respectively. As a result, the gas is admitted into the cavity 45. Subsequently, the molten resin begins to be injected into the cavity 45 (see FIG. 33B). The increase in the flow rate of the gas promotes the cooling of the resin, while the increase in the pressure of the gas allows the gas to press the sink surface Id and the sink insert 44.

After the injection of the resin (see FIG. 34A), the exhaust valve 56 is closed, while the pressure of the gas is adequately controlled by the pressure control unit 51. As a result, the cavity 45 is caused to dwell at a preselected pressure and cooled (see FIGS. 34B and 34C). When the pressure inside the cavity 45 drops substantially to zero, the upper mold 5 is released from the lower mold 4. Thereafter, the molding 1 is taken out of the cavity 45.

This embodiment achieves the same advantages as the fifteenth embodiment, and in addition, achieves an advantage that the sink surface 1d is constantly pressed and therefore, easily separates from the sink insert 44. This allows the sink surface 1d to sink more positively.

FIG. 35 shows an alternative arrangement, wherein the flow control unit 50 is connected to a gas conduit work 57 available in a factory.

Constantly pressing the sink surface 1d, as shown and described, is not essential. Alternatively, at least one of three different methods may be used, as follows: lowering the temperature of at least one of the non-transfer surfaces of the resin below the temperature of the transfer surfaces from the beginning to the end of the injection of the resin; forming a gas layer between at least one of the non-transfer surfaces of the resin and the mold assembly; and lowering the temperature of the mold portion facing at least one of the non-transfer surfaces of the resin below the temperature of the mold portion facing the transfer surfaces.

The fifteenth to eighteenth embodiments, shown and described above, have the following unprecedented advantages.

(1) The non-transfer surface of a molding obtains a parting ability earlier than the other surfaces of the same. This successfully prevents the transfer surfaces of the molding from sinking and thereby allows desired mirror surfaces to be faithfully transferred to the molding in a short molding cycle.

(2) The non-transfer surface of molten rein is held ta a temperature lower than the temperature of the transfer surfaces from the end of resin injection to the beginning of cooling. Consequently, a temperature difference does not occur between the transfer surfaces and the non-transfer surfaces during cooling, so that an internal strain is prevented from remaining in the molding after the opening of the mold assembly. This not only prevents the accuracy of the transfer surfaces from decreasing, but also prevents the entire molding from deforming.

(3) A gas layer is formed between the non-transfer surface of the resin and the mold assembly until the cooling step begins after the injection of the molten resin, preventing the pressure difference between the transfer surfaces and the non-transfer surface from increasing during cooling. Consequently, the internal strain of the molding is prevented from remaining after the opening of the mold assembly. This not only prevents the accuracy of the transfer surfaces from decreasing, but also prevents the entire molding from deforming.

(4) The gas layer is formed between the non-transfer surfaces of the resin and the mold, and/or the temperature of the non-transfer surface, until the cooling step begins after the injection of the molten resin, thereby preventing a difference in temperature or pressure between the transfer surface and the non-transfer surface from increasing during cooling. Consequently, the internal strain of the molding is prevented from remaining after the opening of the mold assembly. This not only prevents the accuracy of the transfer surfaces from decreasing, but also prevents the entire molding from deforming.

(5) The temperature of the non-transfer surface of the resin is lowered, the non-transfer surface is pressed, and/or the gas layer is formed between the non-transfer surface of the resin and the mold. This allows the non-transfer surface to sink with priority by use of a simple construction.

(6) Gas feeding means can be implemented only if a vent hole is formed in the mold and communicates with a feeding device. This prevents the mold configuration from being complicated.

(7) By cooling the non-transfer surface of the mold assembly with cooling means, it is possible to cool the non-transfer surface of the resin. The non-transfer surface can therefore be caused to sink by an inexpensive construction.

Various modifications will become possible for those skilled in the art after receiving the teachings of the present disclosure without departing from the scope thereof. For example, while the embodiments have concentrated on a molding in the form of a rectangular lens (having two mirror surfaces or optical surfaces), the present invention is similarly applicable to, e.g., a mirror having a single mirror surface or a prism having a plurality of mirror surfaces.

What is claimed is:

1. A method of producing a plastic molding, comprising the steps of:

preparing a mold assembly including at least one mold assembly transfer surface and at least one mold assembly non-transfer surface formed on different surfaces of said mold assembly, said at least one mold assembly transfer and non-transfer surfaces forming at least one cavity;

holding said mold assembly at a temperature lower than a softening point of a resin material;

injecting a molten resin, formed by heating said resin material to a temperature above said softening point thereof, into said at least one cavity;

allowing a resin pressure to act on said at least one mold assembly transfer surface to thereby cause said molten resin to adhere to said at least one mold assembly transfer surface;

simultaneously with said injection of said molten resin, feeding a cool gas, which has been compressed to a preselected pressure by an air feed unit and controlled to a preselected temperature by a temperature control unit, to said at least one mold assembly non-transfer surface via a vent hole;

continuing said feeding of said cool gas until said at least one cavity has been fully injected with said molten resin;

at an instant when said at least one cavity has been fully injected with said molten resin, beginning to form a molding having at least one molding non-transfer surface and at least one molding transfer surface from said molten resin by allowing said at least one molding non-transfer surface, which is lower in temperature than said at least one molding transfer surface, to solidify and increase in viscosity and thereby causing said at least one molding non-transfer surface of said molding to begin to lose contact with said at least one mold assembly non-transfer surface of said mold assembly;

cooling said molten resin to a temperature below said softening point of said resin material to complete formation of said molding;

opening said mold assembly, as soon as a pressure inside of said cavity has dropped substantially to zero, in order to allow said molding to be taken out; and holding said at least one molding non-transfer surface of said molding at a temperature lower than a temperature of said molten material during an interval between an end of said injecting of said molten resin into said at least one cavity and a beginning of said cooling of said molten resin to thereby prevent a substantial temperature difference from occurring between said at least one molding transfer surface and said at least one molding non-transfer surface in order for said at least one molding non-transfer surface to move away from said at least one mold assembly non-transfer surface earlier than said at least one molding transfer surface moves away from said at least one mold assembly transfer surface.

2. A method of producing a plastic molding, comprising the steps of:

preparing a mold assembly including at least one mold assembly transfer surface and at least one mold assembly non-transfer surface formed on different surfaces of said mold assembly, said at least one mold assembly transfer and non-transfer surface forming at least one cavity;

holding said mold assembly at a temperature lower than a softening point of a resin material;

injecting a molten resin, formed by heating said resin material to a temperature above said softening point thereof, into said at least one cavity;

allowing a resin pressure to act on said at least one mold assembly transfer surface to thereby cause said molten resin to adhere to said at least one mold assembly transfer surface;

simultaneously with said injection of said molten resin, feeding a cool gas, which has been compressed to a preselected pressure by an air feed unit and controlled to a preselected temperature by a temperature control unit, to said at least one mold assembly non-transfer surface via a vent hole;

continuing said feeding of said cool gas until said at least one cavity has been fully injected with said molten resin;

at an instant when said at least one cavity has been fully injected with said molten resin, beginning to form a molding having at least one molding non-transfer surface and at least one molding transfer surface from said molten resin by allowing said at least one molding non-transfer surface, which is lower in temperature than said at least one molding transfer surface, to solidify and increase in viscosity and thereby causing said at least one molding non-transfer surface of said molding to begin to lose contact with said at least one mold assembly non-transfer surface of said mold assembly;

cooling said molten resin to a temperature below said softening point of said resin material to complete formation of said molding;

opening said mold assembly, as soon as a pressure inside of said cavity has dropped substantially to zero, in order to allow said molding to be taken out; and forming a gas layer between at least one molding non-transfer surface of said molding and said at least one mold assembly non-transfer surface of said mold assembly during an interval between an end of injecting said molten resin into said at least one cavity and a beginning of said cooling of said molten resin to thereby prevent a substantial temperature difference from occurring between said at least one molding transfer surface and said at least one molding non-transfer surface in order for said at least one molding non-transfer surface to move away from said at least one mold assembly non-transfer surface earlier than said at least one molding transfer surface moves away from said at least one mold assembly transfer surface.

3. A method of producing a plastic molding, comprising the steps of:

preparing a mold assembly including at least one mold assembly transfer surface and at least one mold assembly non-transfer surface formed on different surfaces of said mold assembly, said at least one mold assembly transfer and non-transfer surfaces forming at least one cavity;

holding said mold assembly at a temperature lower than a softening point of a resin material;

injecting a molten resin, formed by heating said resin material to a temperature above said softening point thereof, into said at least one cavity;

allowing a resin pressure to act on said at least one mold assembly transfer surface to thereby cause said molten resin to adhere to said at least one mold assembly transfer surface;

simultaneously with said injection of said molten resin, feeding a cool gas, which has been compressed to a preselected pressure by an air feed unit and controlled to a preselected temperature by a temperature control unit, to said at least one mold assembly non-transfer surface via a vent hole;

continuing said feeding of said cool gas until said at least one cavity has been fully injected with said molten resin;

at an instant when said at least one cavity has been fully injected with said molten resin, beginning to form a molding having at least one molding non-transfer surface and at least one molding transfer surface from said molten resin by allowing said at least one molding non-transfer surface, which is lower in temperature than said at least one molding transfer surface, to solidify and increase in viscosity and thereby causing said at least one molding non-transfer surface of said molding to begin to lose contact with said at least one mold assembly non-transfer surface of said mold assembly;

cooling said molten resin to a temperature below said softening point of said resin material to complete formation of said molding;

opening said mold assembly, as soon as a pressure inside of said cavity has dropped substantially to zero, in order to allow said molding to be taken out; and maintaining a portion of said mold assembly facing at least one molding non-transfer surface of said molding lower in temperature than a portion of said mold assembly facing said at least one mold assembly transfer surface of said mold assembly until such a time when said injecting of said molten resin into said at least one cavity ends to thereby prevent a substantial temperature difference from occurring between said at least one molding transfer surface and said at least one molding non-transfer surface in order for said at least one molding non-transfer surface to move away from said at least one mold assembly non-transfer surface earlier than said at least one molding transfer surface moves away from said at least one mold assembly transfer surface.

4. A method of producing a plastic molding, comprising the steps of:

preparing a mold assembly including at least one mold assembly transfer surface and at least one mold assembly non-transfer surface formed on different surfaces of said mold assembly, said at least one mold assembly transfer and non-transfer surfaces forming at least one cavity;

holding said mold assembly at a temperature lower than a softening point of a resin material;

injecting a molten resin, formed by heating said resin material to a temperature above said softening point thereof, into said at least one cavity;

allowing a resin pressure to act on said at least one mold assembly transfer surface to thereby cause said molten resin to adhere to said at least one mold assembly transfer surface;

simultaneously with said injection of said molten resin, feeding a cool gas, which has been compressed to a preselected pressure by an air feed unit and controlled to a preselected temperature by a temperature control unit, to said at least one mold assembly non-transfer surface via a vent hole;

continuing said feeding of said cool gas until said at least one cavity has been fully injected with said molten resin;

at an instant when said at least one cavity has been fully injected with said molten resin, beginning to form a molding having at least one molding non-transfer surface and at least one molding transfer surface from said molten resin by allowing said at least one molding non-transfer surface, which is lower in temperature than said at least one molding transfer surface, to solidify and increase in viscosity and thereby causing said at least one molding non-transfer surface of said molding to begin to lose contact with said at least one mold assembly non-transfer surface of said mold assembly;

cooling said molten resin to a temperature below said softening point of said resin material to complete formation of said molding;

opening said mold assembly, as soon as a pressure inside of said cavity has dropped substantially to zero, in order to allow said molding to be taken out; and effecting, during an interval between an end of aid injecting of said molten resin into said at least one cavity and a beginning of said cooling of said molten resin, at least one of:

lowering a temperature of said at least one molding non-transfer surface of said molding below a temperature of said at least one mold assembly transfer surface of said mold assembly;

forming a gas layer between said at least one molding non-transfer surface of said molding and said at least one mold assembly non-transfer surface of said mold assembly; and lowering a temperature of said at least one mold assembly non-transfer surface of said mold assembly facing said at least one molding non-transfer surface of said molding below a temperature of said at least one mold assembly transfer surface of said mold assembly facing said at least one molding transfer surface of said molding, to thereby prevent a substantial temperature difference from occurring between said at least one molding transfer surface and said at least one molding non-transfer surface in order for said at least one molding non-transfer surface to move away from said at least one mold assembly non-transfer surface earlier than said at least one molding transfer surface moves away from said at least one mold assembly transfer surface.

5. A method of producing a plastic molding, comprising the steps of:

preparing a mold assembly including at least one mold assembly transfer surface and at least one mold assembly non-transfer surface formed on different surfaces of said mold assembly, said at least one mold assembly transfer and non-transfer surfaces forming at least one cavity;

holding said mold assembly at a temperature lower than a softening point of a resin material;

injecting a molten resin, formed by heating said resin material to a temperature above said softening point thereof, into said at least one cavity;

allowing a resin pressure to act on said at least one mold assembly transfer surface to thereby cause said molten resin to adhere to said at least one mold assembly transfer surface;

simultaneously with said injection of said molten resin, feeding a cool gas, which has been compressed to a preselected pressure by an air feed unit and controlled to a preselected temperature by a temperature control unit, to said at least one mold assembly non-transfer surface via a vent hole;

continuing said feeding of said cool gas until said at least one cavity has been fully injected with said molten resin;

at an instant when said at least one cavity has been fully injected with said molten resin, beginning to form a molding having at least one molding non-transfer surface and at least one molding transfer surface from said molten resin by allowing said at least one molding non-transfer surface, which is lower in temperature than said at least one molding transfer surface, to solidify and increase in viscosity and thereby causing said at least one molding non-transfer surface of said molding to begin to lose contact with said at least one mold assembly non-transfer surface of said mold assembly;

cooling said molten resin to a temperature below said softening point of said resin material to complete formation of said molding;

opening said mold assembly, as soon as a pressure inside of said cavity has dropped substantially to zero, in order to allow said molding to be taken out;

effecting, during an interval between an end of said injecting of said molten resin into said at least one cavity and a beginning of said cooling of said molten resin, at least one of:

lowering a temperature of said at least one molding non-transfer surface of said molding below a temperature of said at least one mold assembly transfer surface of said mold assembly;

forming a gas layer between said at least one molding non-transfer surface of said molding and said at least one mold assembly non-transfer surface of said mold assembly; and lowering a temperature of said at least one mold assembly non-transfer surface of said mold assembly facing said at least one molding non-transfer surface of said molding below a temperature of said at least one mold assembly transfer surface of said mold assembly facing said at least one molding transfer surface of said molding, to thereby prevent a substantial temperature difference from occurring between said at least one molding transfer surface and said at least one molding non-transfer surface in order for said at least one molding non-transfer surface to move away from said at least one mold assembly non-transfer surface earlier than said at least one molding transfer surface moves away from said at least one mold assembly transfer surface; and pressing said at least one molding non-transfer surface of said molding by a gas.

\* \* \* \* \*